United States Patent [19]
Tochigi et al.

[11] Patent Number: 5,963,378
[45] Date of Patent: *Oct. 5, 1999

[54] ZOOM LENS

[75] Inventors: Nobuyuki Tochigi; Hiroyuki Hamano, both of Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/411,157

[22] Filed: Mar. 27, 1995

[30] Foreign Application Priority Data

Mar. 30, 1994 [JP] Japan ................................... 6-061144
May 25, 1994 [JP] Japan ................................... 6-111028

[51] Int. Cl.$^6$ .................................................. G02B 15/14
[52] U.S. Cl. ........................... 359/687; 359/683; 359/684
[58] Field of Search .................................... 359/684, 686, 359/687, 688, 683, 676

[56] References Cited

U.S. PATENT DOCUMENTS

| | | | |
|---|---|---|---|
| Re. 32,923 | 5/1989 | Kreitzer | 350/423 |
| 4,256,381 | 3/1981 | Kreitzer | 359/687 |
| 4,299,454 | 11/1981 | Betensky | 350/427 |
| 4,832,471 | 5/1989 | Hamano | 350/427 |
| 4,934,796 | 6/1990 | Sugiura et al. | 350/427 |
| 4,988,174 | 1/1991 | Horiuchi et al. | 350/427 |
| 5,050,972 | 9/1991 | Mukaiya et al. | 359/683 |
| 5,134,524 | 7/1992 | Hamano et al. | 359/687 |
| 5,138,492 | 8/1992 | Hamano et al. | 359/684 |
| 5,191,476 | 3/1993 | Sato | 359/687 |
| 5,235,466 | 8/1993 | Ono et al. | 359/687 |
| 5,299,064 | 3/1994 | Hamano et al. | 359/684 |
| 5,341,243 | 8/1994 | Okuyama et al. | 359/684 |
| 5,530,592 | 6/1996 | Tochigi | 359/684 |
| 5,583,698 | 12/1996 | Yamada et al. | 359/687 |
| 5,585,969 | 12/1996 | Endo | 359/683 |

FOREIGN PATENT DOCUMENTS

| | | |
|---|---|---|
| 58-136012 | 8/1983 | Japan . |
| 58-160913 | 9/1983 | Japan . |
| 62-24213 | 2/1987 | Japan . |
| 62-247316 | 10/1987 | Japan . |
| 63-29718 | 2/1988 | Japan . |
| 63-44614 | 2/1988 | Japan . |
| 63-278013 | 11/1988 | Japan . |
| 5-72472 | 3/1993 | Japan . |

Primary Examiner—Georgia Epps
Assistant Examiner—Jordan M. Schwartz
Attorney, Agent, or Firm—Fitzpatrick, Cella, Harper & Scinto

[57] ABSTRACT

A zoom lens is disclosed, comprising, from front to rear, a first lens unit of positive refractive power, a second lens unit of negative refractive power, a third lens unit of positive reactive power and a fourth lens unit of positive refractive power, an aperture stop being positioned between the second and third lens units, the second and fourth lens unit being axially moved to effect zooming and the fourth lens unit being axially moved to effect focusing, wherein particular rules of design are set fourth for the third and fourth lens units to insure that the back focal distance is long enough to contain a color separation prism, and wherein the zoom ratio takes a high value.

12 Claims, 20 Drawing Sheets

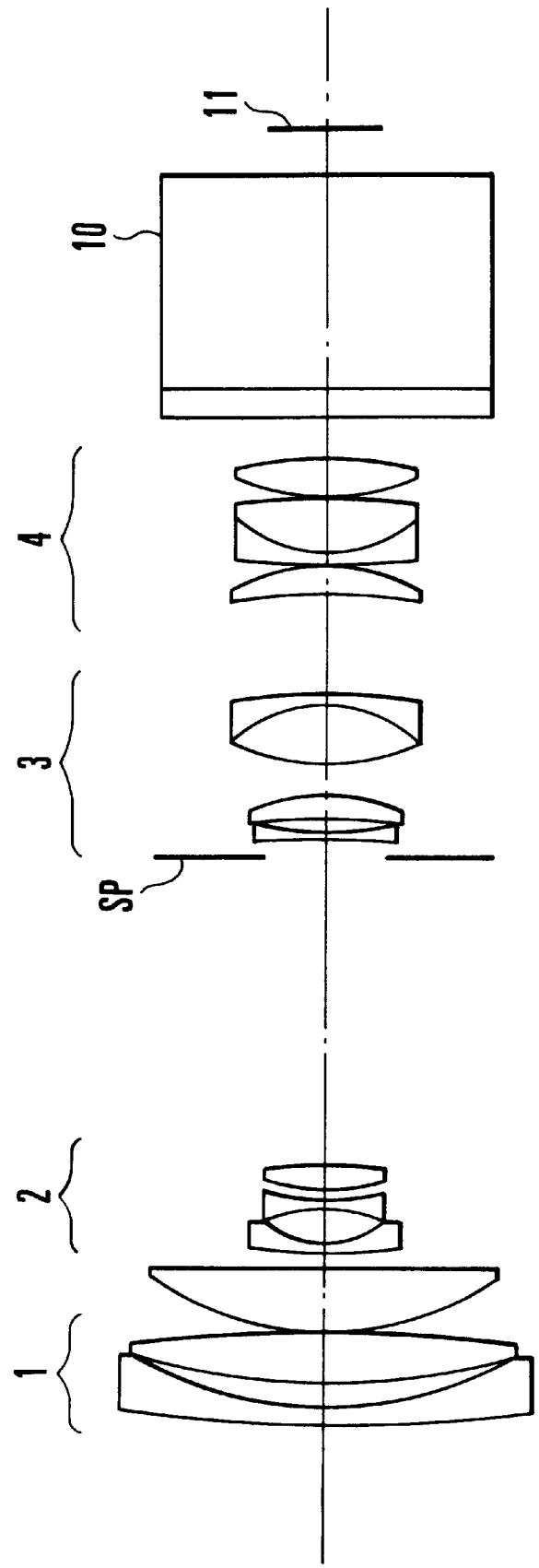

ZOOM LENS

BACKGROUND OF THE INVENTION

1. Field of the Invention

This invention relates to zoom lenses of the rear focus type to be used in video cameras and, more particularly, to zoom lenses of the rear focus type having either or both of a long back focal distance and a long optical distance from the exit pupil.

2. Description of the Related Art

In the field of art of zoom lenses for use in photographic cameras or video cameras, it has been known to provide a type of focusing configuration in which a lens unit in rear of the front or first lens unit is moved to effect focusing. A great many examples using such a so-called rear focus type have been proposed. This is because the rear focus type has merits that, owing to the use of a lens unit of relatively small size and light weight as the focusing lens, consumption of driving power is saved and that rapid focus adjustment becomes possible to perform.

A zoom lens of the rear focus type as such is disclosed in, for example, Japanese Laid-Open Patent Application No. Sho 63-44614, comprising, from front to rear, a first lens unit of positive refractive power, a second lens unit of negative refractive power for varying the focal length, a third lens unit of negative refractive power for compensating for the image shift with zooming and a fourth lens unit of positive refractive power, totaling four lens units. In this so-called 4-unit zoom lens, the third lens unit is made axially movable for focusing.

However, this kind of zoom lens has to create a surplus space for the movement of the third lens unit. Therefore, the physical length of the complete lens tends to increase largely. In another Japanese Laid-Open Patent Application No. Sho 58-136012, the zooming section is constructed with three or more lens units, one of which is made movable for focusing.

In Japanese Laid-Open Patent Application No. Sho 62-247316, a zoom lens comprises, from front to rear, a first lens unit of positive refractive power, a second lens unit of negative refractive power, a third lens unit of positive refractive power and a fourth lens unit of positive refractive power, the second lens unit being moved to vary the focal length, while simultaneously moving the fourth lens unit to compensate for the image shift. Focusing is performed by moving the fourth lens unit.

In Japanese Laid-Open Patent Application No. Sho 58-160913, a zoom lens comprises, from front to rear, a first lens unit of positive refractive power, a second lens unit of negative refractive power, a third lens unit of positive refractive power and a fourth lens unit of positive refractive power, totaling four lens units, the first and second lens units being moved to vary the focal length, while simultaneously moving the fourth lens unit to compensate for the image shift. Of these lens units, one or two or more ones are moved to effect focusing.

In Japanese Laid-Open Patent Application No. Sho 62-24213, a zoom lens comprises, from front to rear, a first lens unit of positive refractive power, a second lens unit of negative refractive power, a third lens unit of positive refractive power and a fourth lens unit of positive refractive power, totaling four lens units, the second lens unit being moved to vary the focal length and the fourth lens unit being moved to compensate for the image shift and to effect focusing.

In Japanese Laid-Open Patent Application No. Sho 63-278013, a zoom lens comprises, from front to rear, a first lens unit of positive refractive power, a second lens unit of negative refractive power, a third lens unit of negative refractive power and a fourth lens unit of positive refractive power, the second lens unit being moved to vary the focal length, and the fourth lens unit being moved to compensate for the image shift and to effect focusing.

In this form of zoom lenses, however, the diverging light beam from the second lens unit is further diverged in passing through the third lens unit. Therefore, the size of the fourth lens unit is caused to increase largely. Moreover, the range of variation of aberrations with focusing tends to increase.

Japanese Laid-Open Patent Application No. Sho 6329718 discloses a zoom lens comprising, from front to rear, a first lens unit made up from a negative lens, a positive lens and a positive lens, totaling three lenses, and having a positive overall focal length, a second lens unit made up from a negative lens, a negative lens and a positive lens, totaling three lenses, having a negative overall focal length and movable for zooming mainly to govern variation of the focal length, a third lens unit made up from one or two or three lenses, having a positive overall focal length, always stationary, playing a role of an afocal one in respect to the angle of emergence, and including an aspheric surface, and, after a little long air spacing, a fourth lens unit made up either from a negative lens, a positive lens and a positive lens, or from a positive lens, a positive lens and a negative lens, totaling three lenses, having a positive overall focal length, movable for maintaining the constant focal plane during zooming, that is, playing a role of a so-called compensator, and made movable for focusing. However, if the ratio of the focal length of the third lens unit to that of the fourth lens unit is too high, it could be difficult to obtain a sufficiently long back focal distance.

Japanese Laid-Open Patent Application No. Hei 5-72472 discloses an aspherical zoom lens comprising, from front to rear, a fixed first lens unit of positive refractive power, a second lens unit of negative refractive power for varying the focal length, a fixed third lens unit of positive refractive power having a light collecting action, and a fourth lens unit of positive refractive power axially movable for maintaining the constant image plane. This zoom lens has its third and fourth lens units spaced apart by a relatively long distance. The first lens unit is comprised of, from front to rear, a negative lens, bi-convex lens and a positive meniscus lens. The second lens unit is comprised of a negative meniscus lens, a bi-concave lens and a positive lens. The third lens unit is made up from a single lens of which at least one surface is aspherical. The fourth lens unit includes at least one aspherical lens and is made up from one negative lens and two positive lenses.

However, this form of zoom lens, though having a long back focal distance, seems, in view of the embodiments, that when zooming to a middle position, the distance from the exit pupil to the color separation optical system becomes considerably short, causing color shading to occur in the color separation optical system with a high possibility.

In U.S. Pat. No. 4,299,454, a zoom lens comprises, from front to rear, a positive first lens unit, a negative second lens unit and a positive rear lens unit, wherein at least two lens units including the negative second lens unit are moved to effect zooming, and the negative second lens unit is made up from first and second negative lenses and a positive doublet. However, the embodiment teaches that the third lens unit has its frontmost lens made negative in power. In this case, the third lens unit is selected to be movable. Therefore, the operating mechanism tends to be complicated. So, it is difficult to obtain a sufficiently long back focal distance.

U.S. Reissue Pat. No. 32,923 discloses a zoom lens comprising, from front to rear, a positive first lens unit, a negative second lens unit, a stop, a positive third lens unit and a positive fourth lens unit, the first and fourth lens units moving in the same direction during zooming, and the stop remaining stationary during zooming. The embodiments teach that the third lens unit has its frontmost lens made negative in power. However, it cannot be said that the back focal distance is long enough.

In general, the use of the rear focus type in the zoom lens, as described before, gives a configuration having the merits that the lens system is reduced in size as a whole and also that rapid focusing becomes possible and further that short focusing is easy to do.

For its counterpart, however, the range of variation of aberrations with focusing is liable to increase largely. So, it becomes very difficult to assure minimization of the bulk and size of the entire lens system in such a manner that good stability of optical performance is maintained at a high level throughout the entire focusing range.

It should also be noted that, at present, the single chip type CCD is widely used in video cameras for home use. In this case, there is no need to use a color separation prism and associated parts therewith which are prerequisite for the multiple chip type CCD used mainly in the professional video cameras. The zoom lenses for video cameras for home use have, therefore, their back focal distance and eye relief made relatively short.

In application to the video cameras using the multiple chip type CCD, however, because the color separation prism and associated parts therewith must be arranged in rear of the zoom lens, the zoom lens suffers a problem that, as compared with the zoom lens for the video camera using the single chip type CCD, the back focal distance has to be relatively long, and the eye relief has to be sufficiently long.

SUMMARY OF THE INVENTION

The present invention employs the rear focus type to prevent the bulk and size of the entire lens system from increasing unduly greatly, when good optical performance is maintained throughout the entire zooming range. In its preferred embodiments, the invention is to provide a zoom lens of long back focal distance whose exit pupil lies in a far position away from the rear vertex, and which has a simple form.

The invention is concerned with rear focus type zoom lenses of 4-unit form and has novelties in the form and the construction and arrangement of the constituent lenses of, in particular, the third and fourth lens units. It is, therefore, another object of the invention to provide a zoom lens which permits a color separation prism to be used behind.

A zoom lens of the invention comprises, from front to rear, a first lens unit having a positive refractive power, a second lens unit having a negative refractive power, a stop, a third lens unit having a positive refractive power and a fourth lens unit having a positive refractive power, the second lens unit axially moving rearward to vary the focal length from the shortest to the longest one, and the fourth lens unit performing the function of compensating for the image shift with zooming and the focusing function, wherein either the third lens unit is made up from at least one negative lens and at least one positive lens, or the fourth lens unit is made up from at least three positive lenses and at least one negative lens, and proper rules are set forth for various optical design parameters.

BRIEF DESCRIPTION OF THE DRAWINGS

FIG. 15 is a lens block diagram of a numerical example 8 of the invention.

In the aberration curves, d stands for the spectral d-line, g for the spectral g-line, $\Delta M$ for the meridional image focus, and $\Delta S$ for the sagittal image focus.

DETAILED DESCRIPTION OF THE PREFERRED EMBODIMENTS

Figure 1:
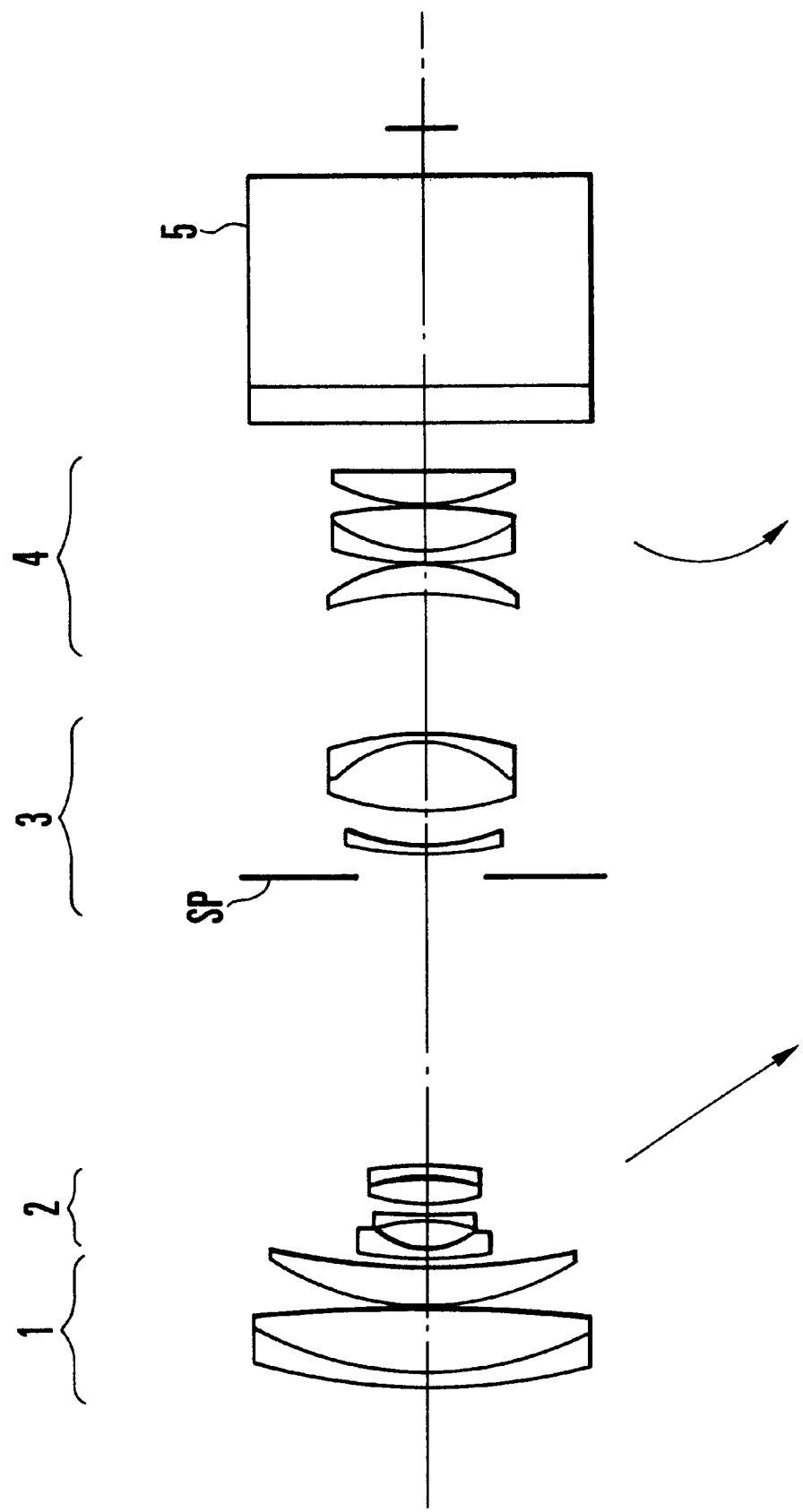
FIG. 1 is a lens block diagram of a numerical example 1 of the invention.
Figure 2A:
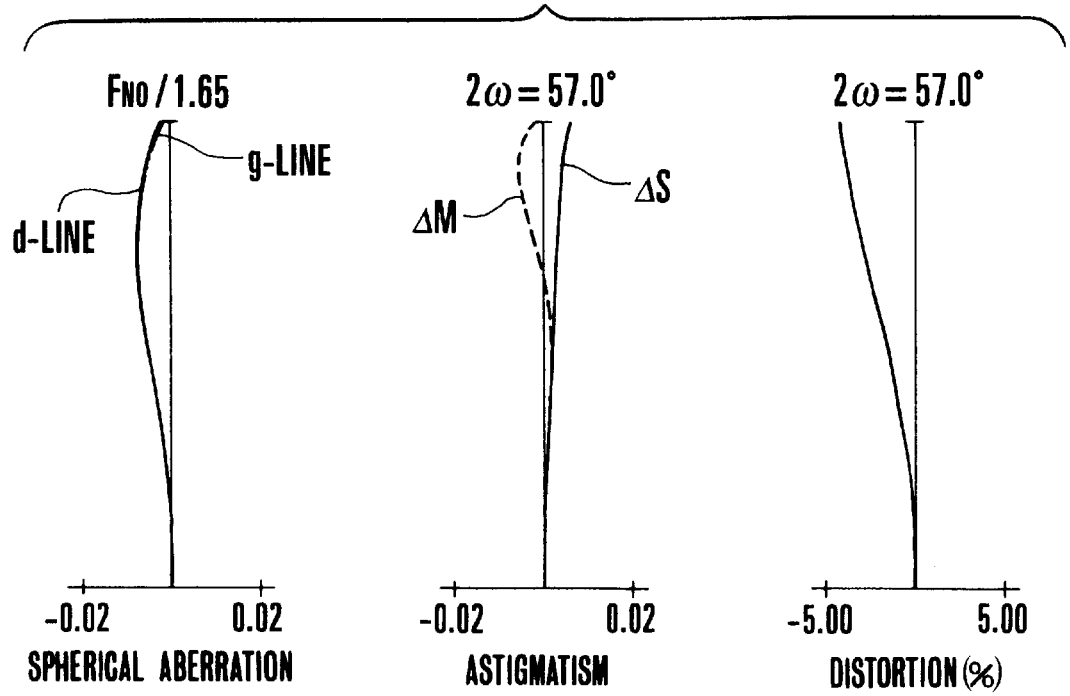
FIGS. 2(A) and 2(B) are graphic representations of the aberrations of the numerical example 1 of the invention.
Figure 2B:
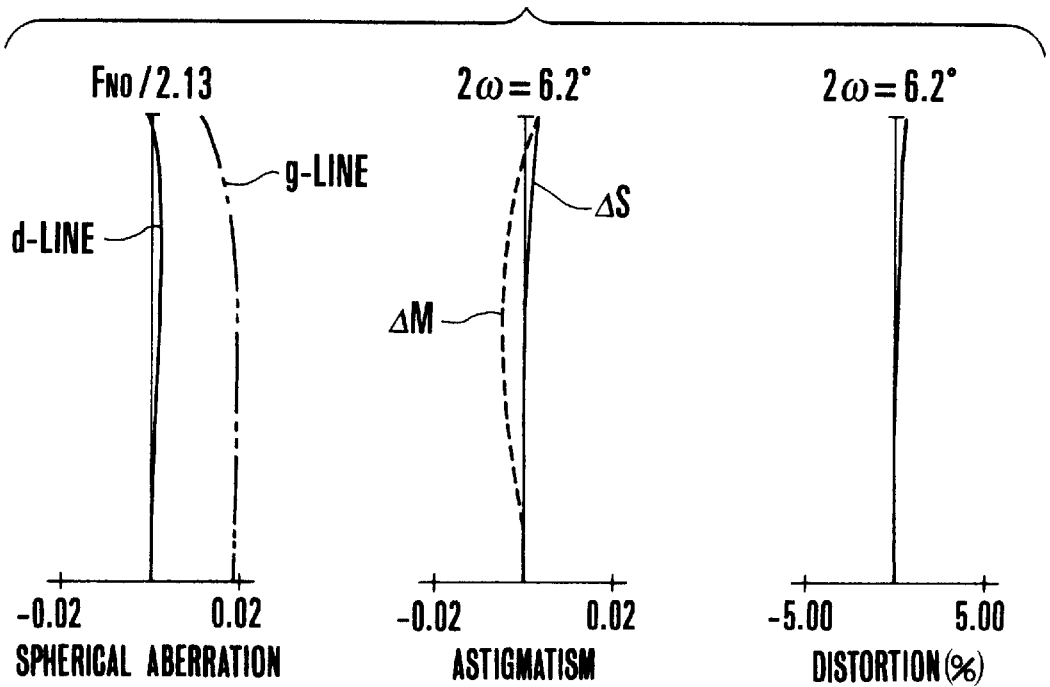
Figure 3:
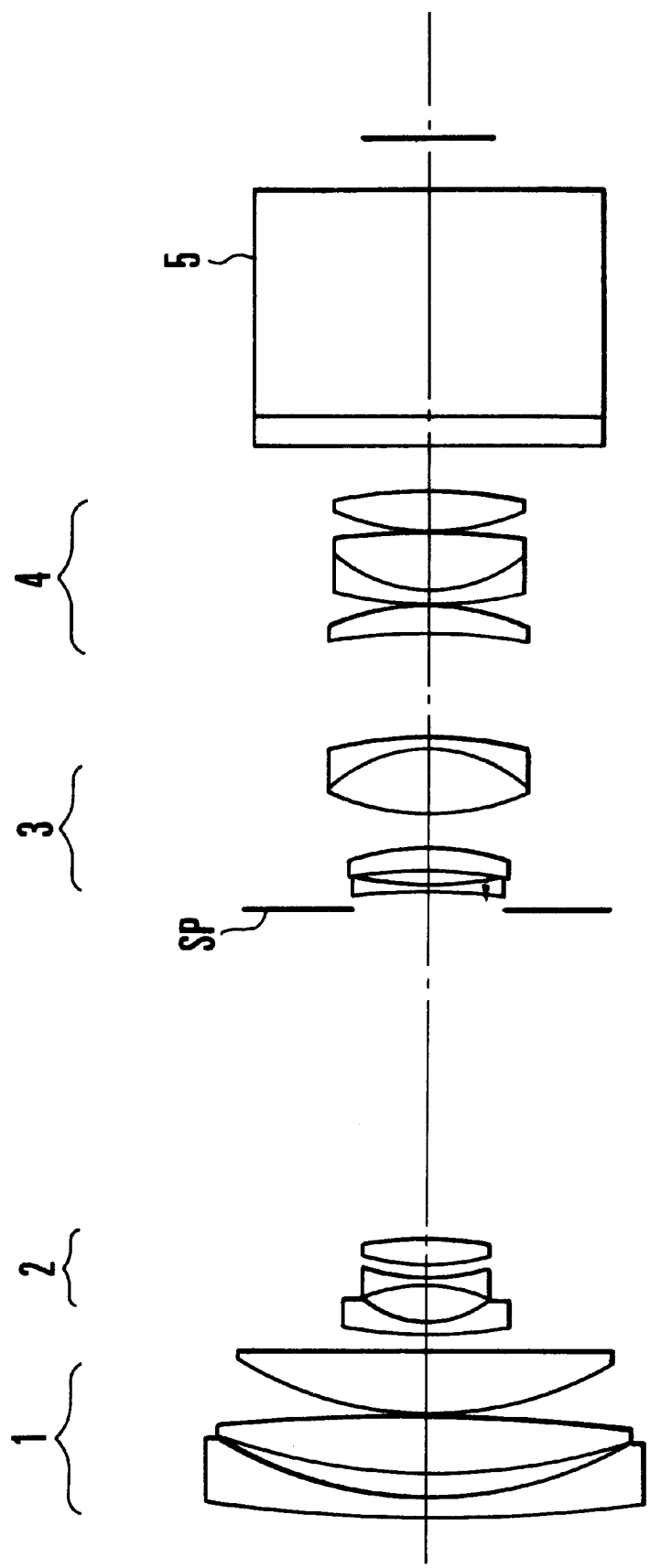
FIG. 3 is a lens block diagram of a numerical example 2 of the invention.
Figure 4A:
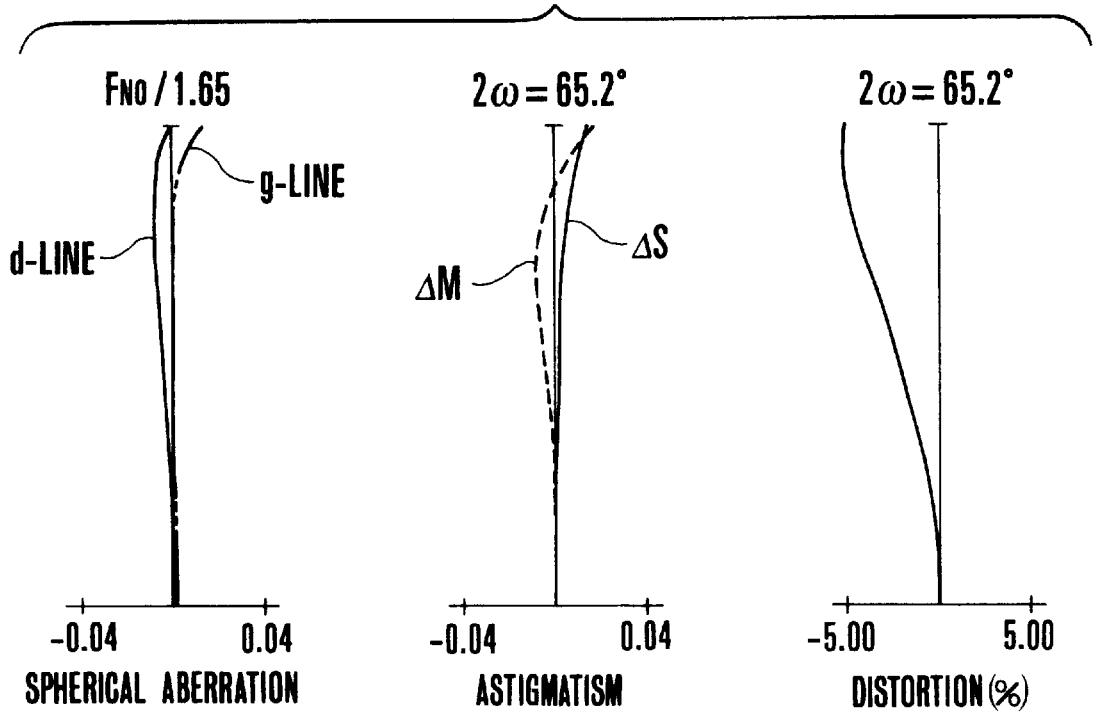
FIGS. 4(A) and 4(B) are graphic representations of the aberrations of the numerical example 2 of the invention.
Figure 4B:
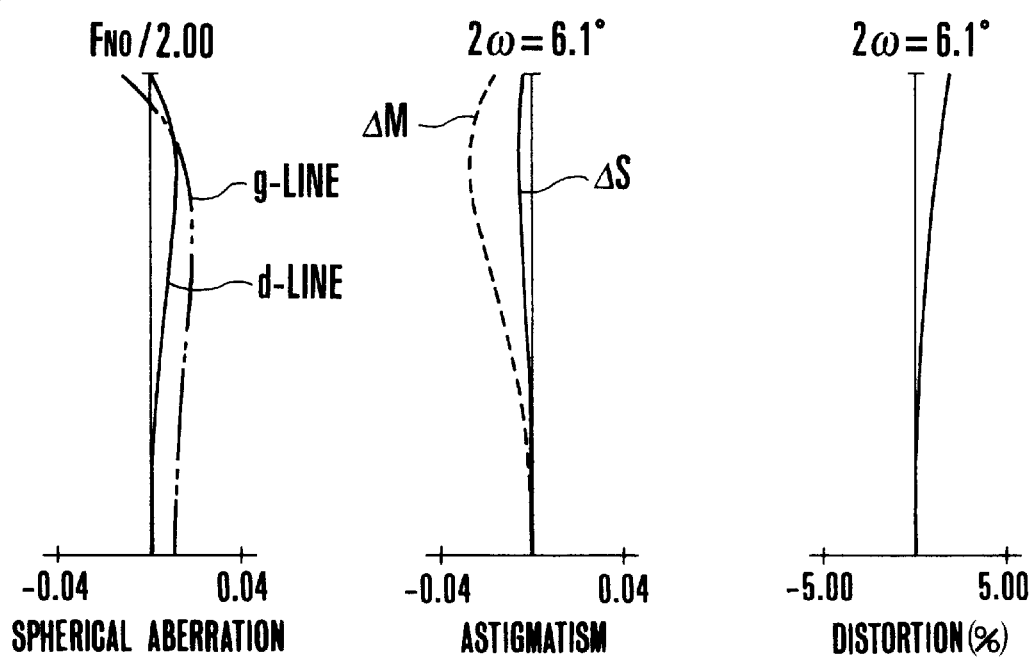
Figure 5:
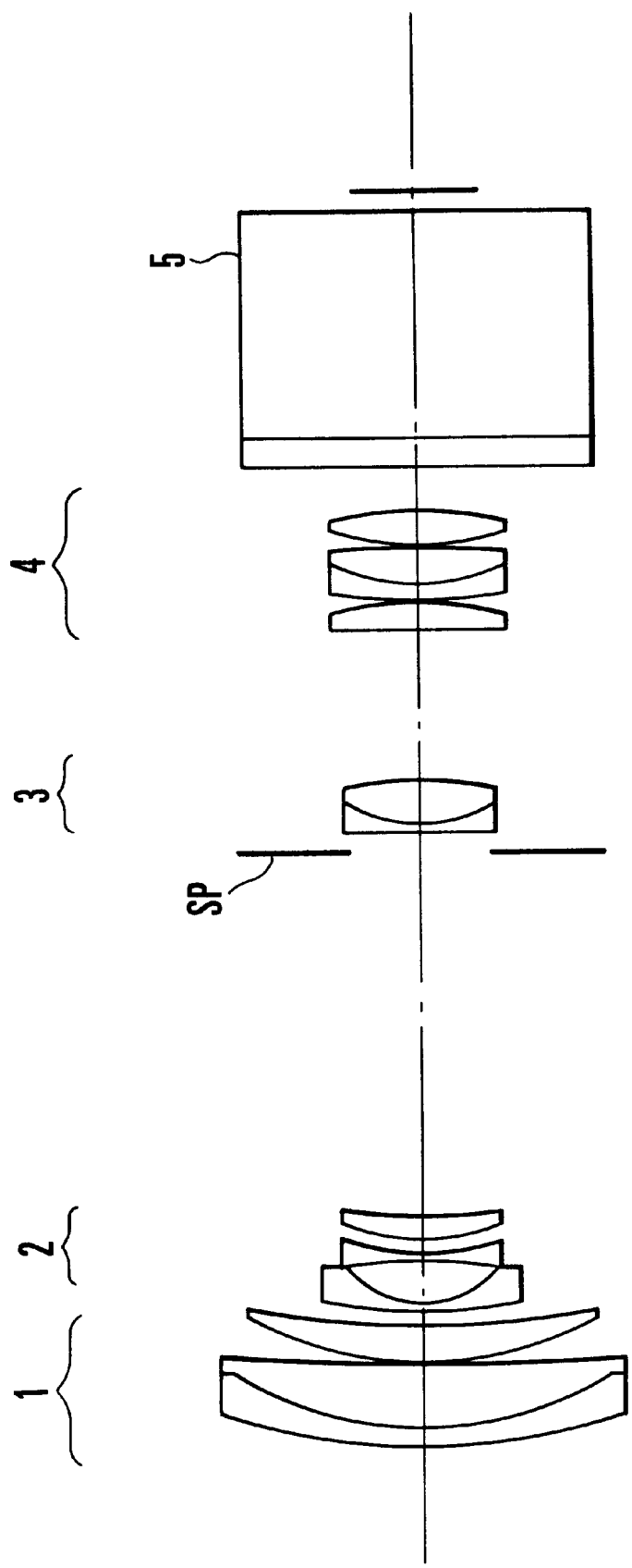
FIG. 5 is a lens block diagram of a numerical example 3 of the invention.
Figure 6A:
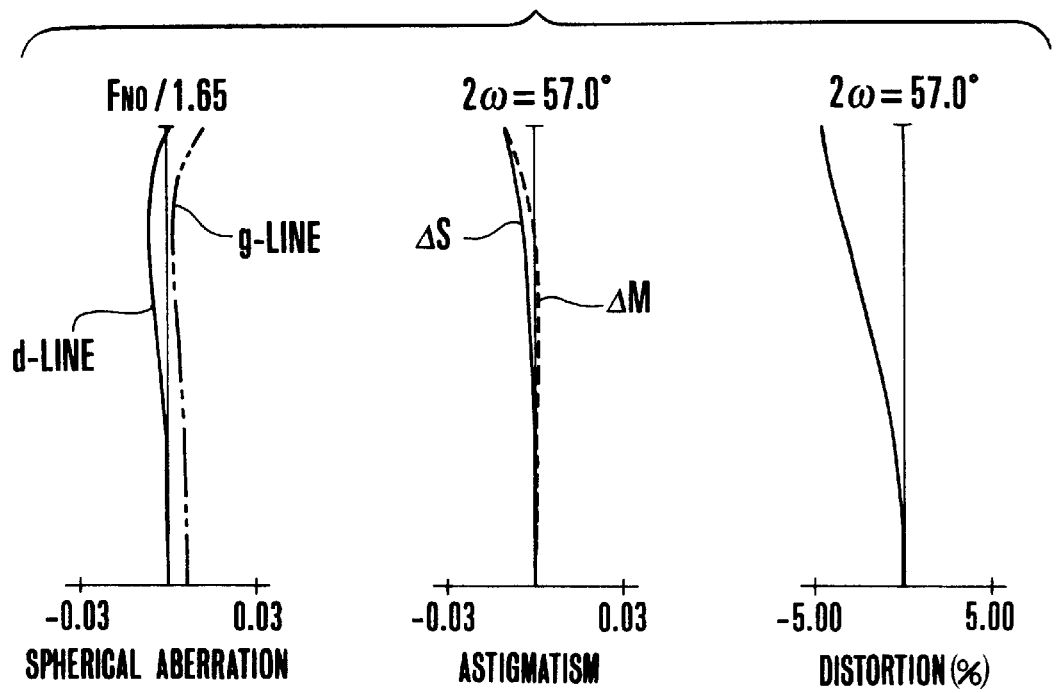
FIGS. 6(A) and 6(B) are graphic representations of the aberrations of the numerical example 3 of the invention.
Figure 6B:
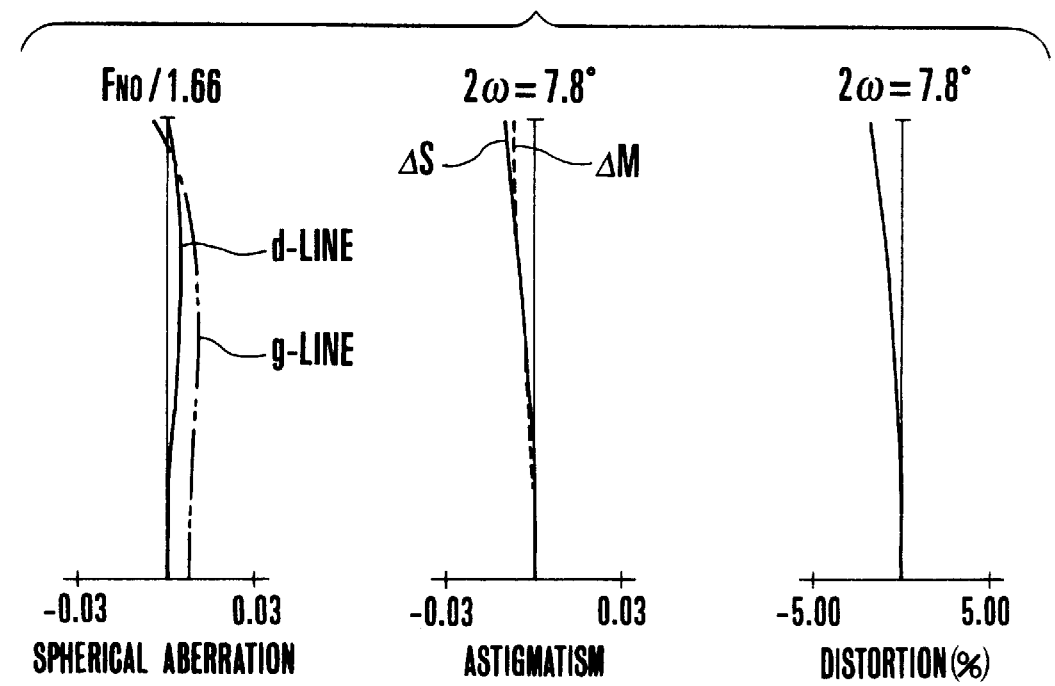
Figure 7:
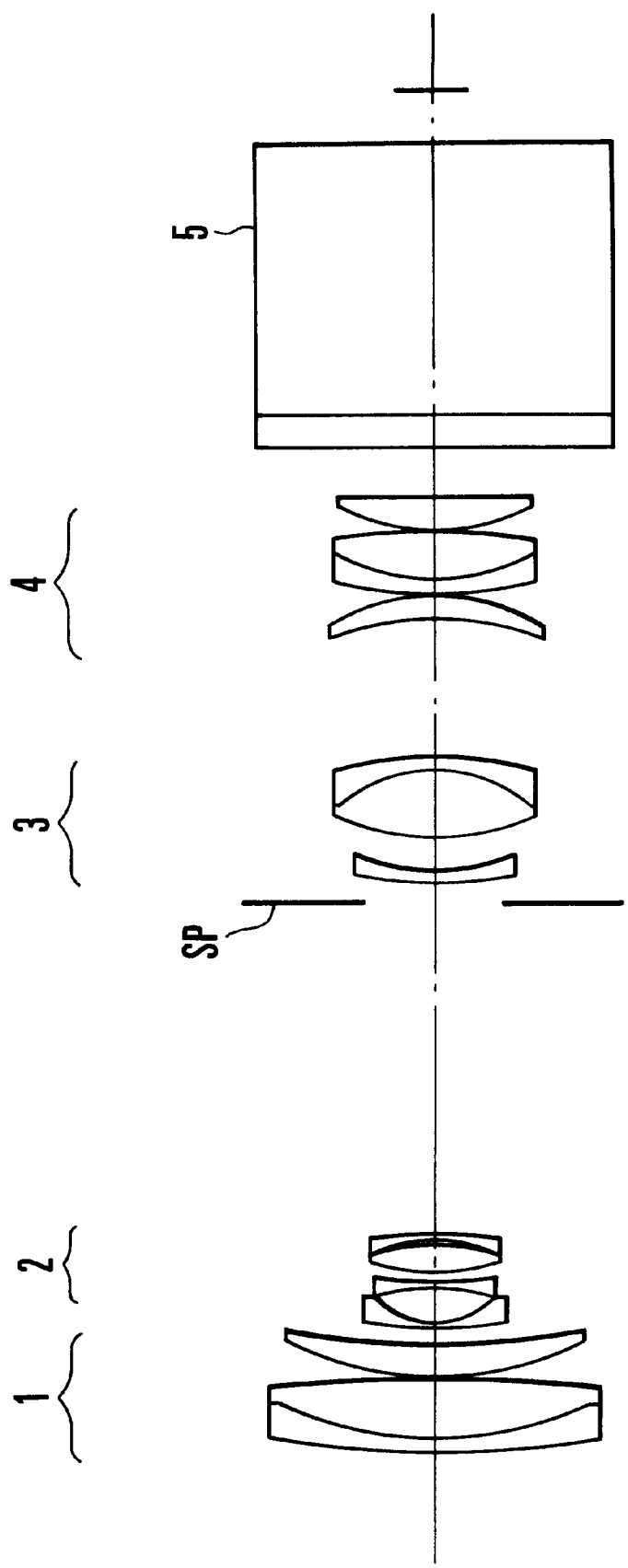
FIG. 7 is a lens block diagram of a numerical example 4 of the invention.
Figure 8A:
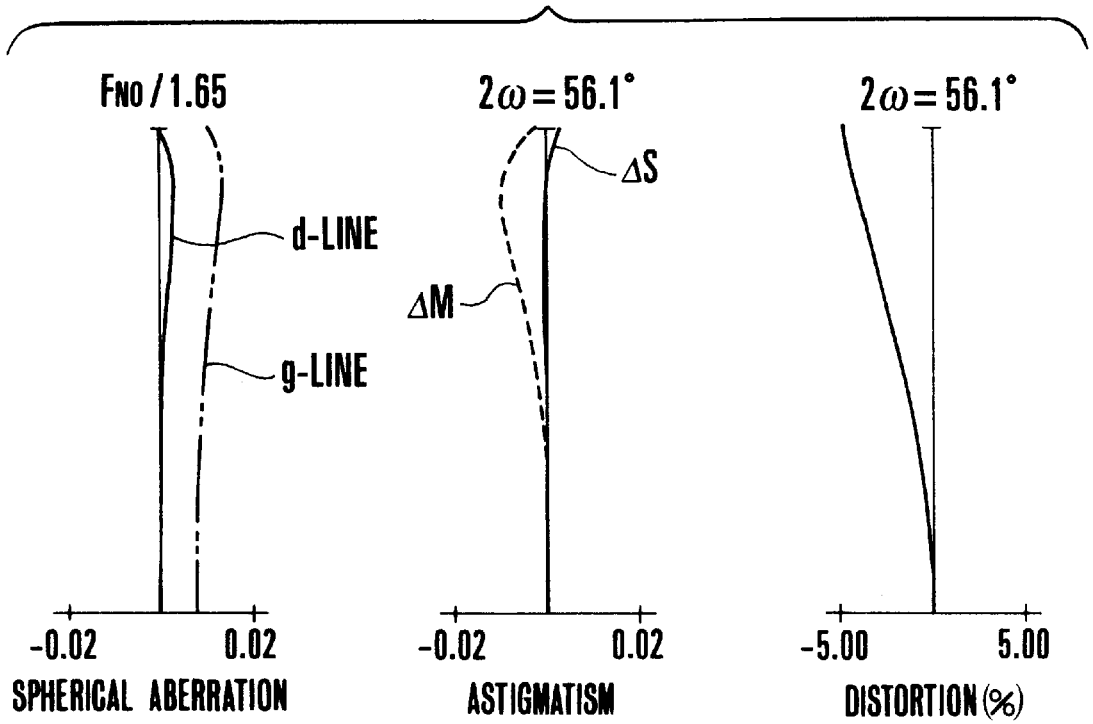
FIGS. 8(A) and 8(B) are graphic representations of the aberrations of the numerical example 4 of the invention.
Figure 8B:
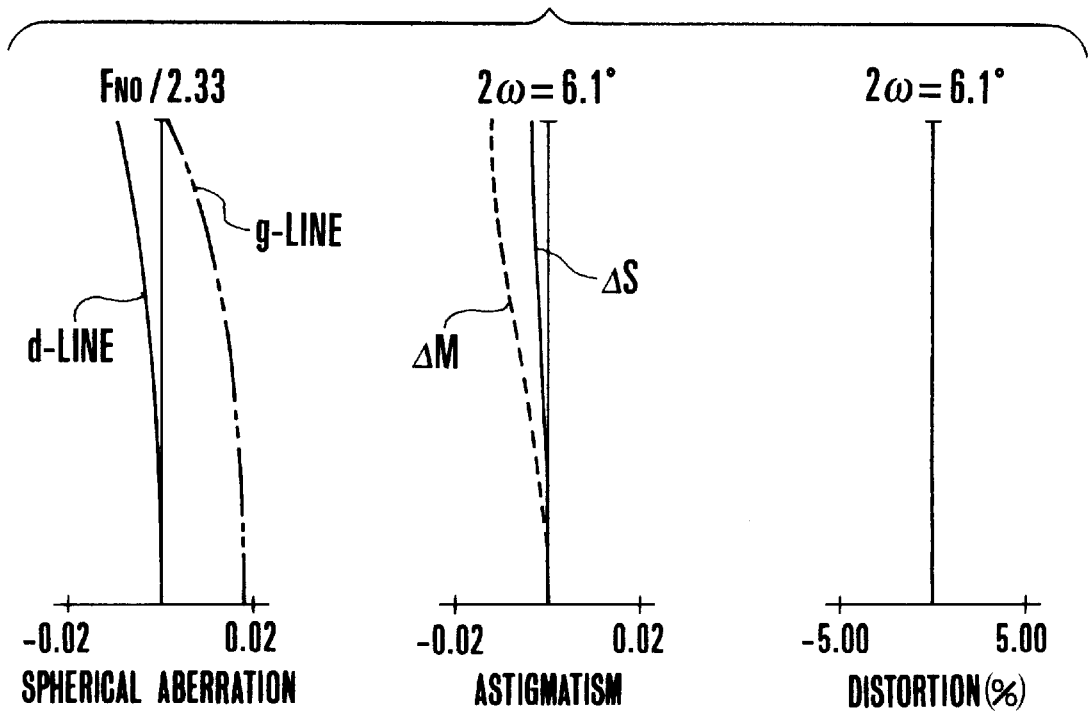
Figure 9:
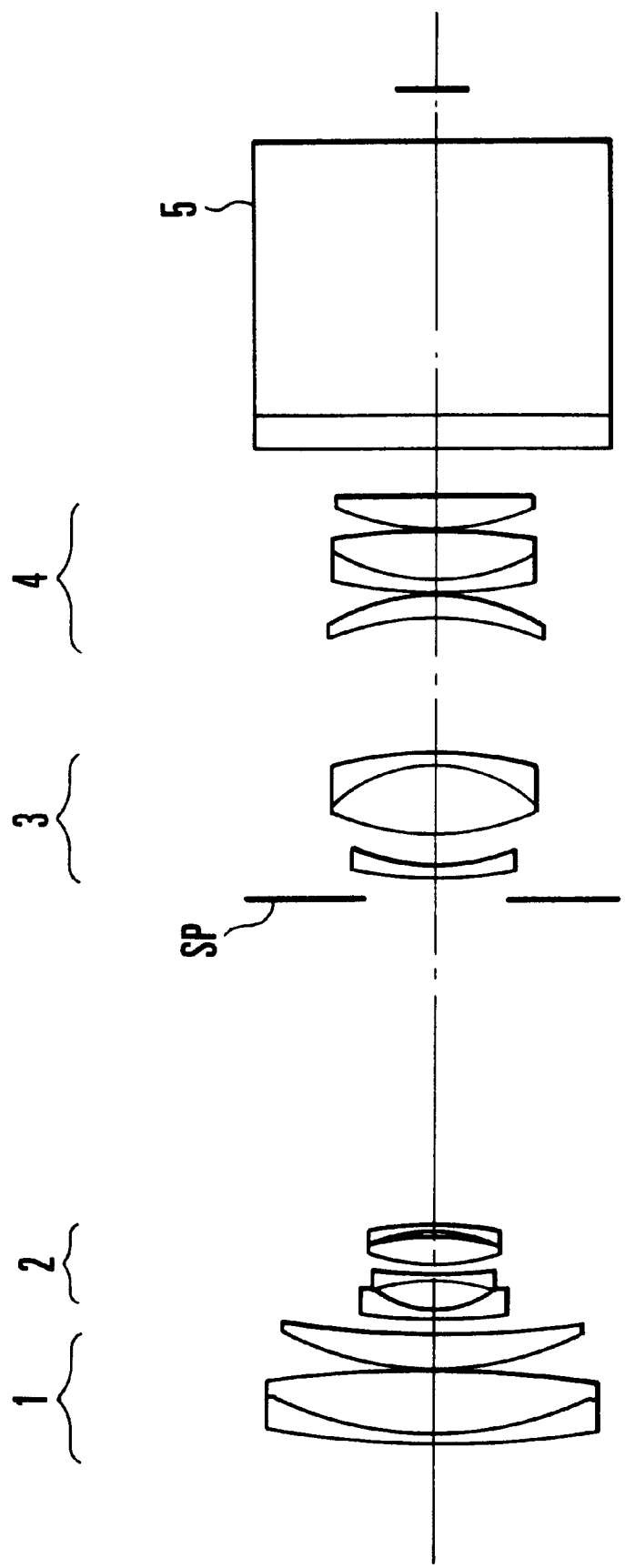
FIG. 9 is a lens block diagram of a numerical example 5 of the invention.
Figure 10A:
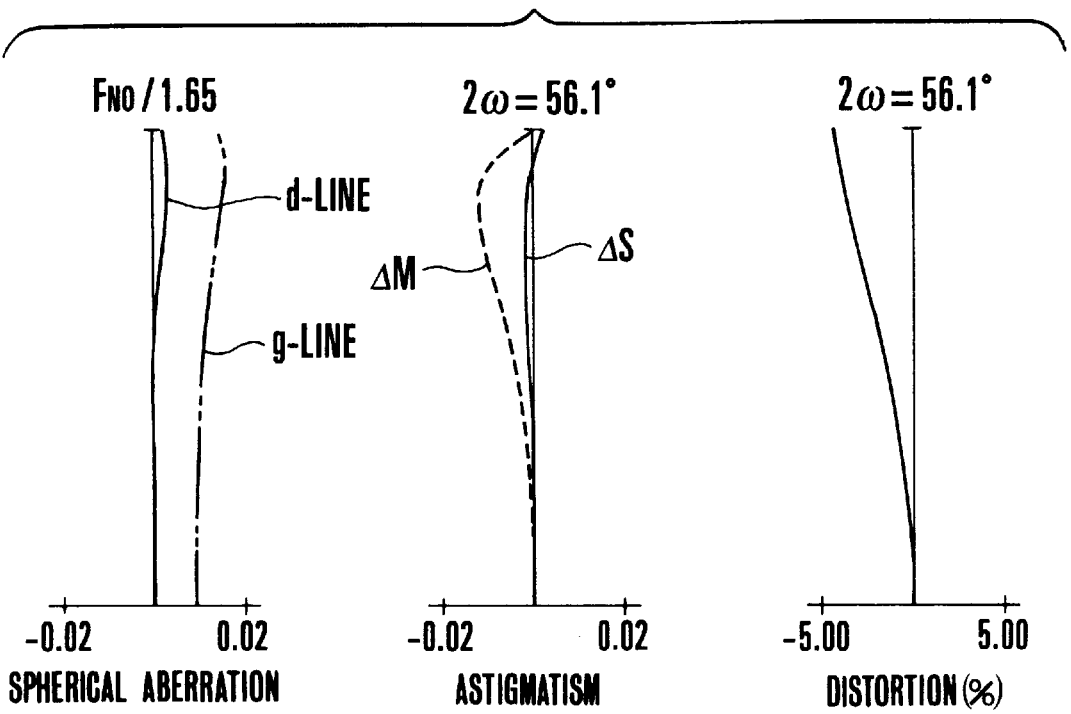
FIGS. 10(A) and 10(B) are graphic representations of the aberrations of the numerical example 5 of the invention.
Figure 10B:
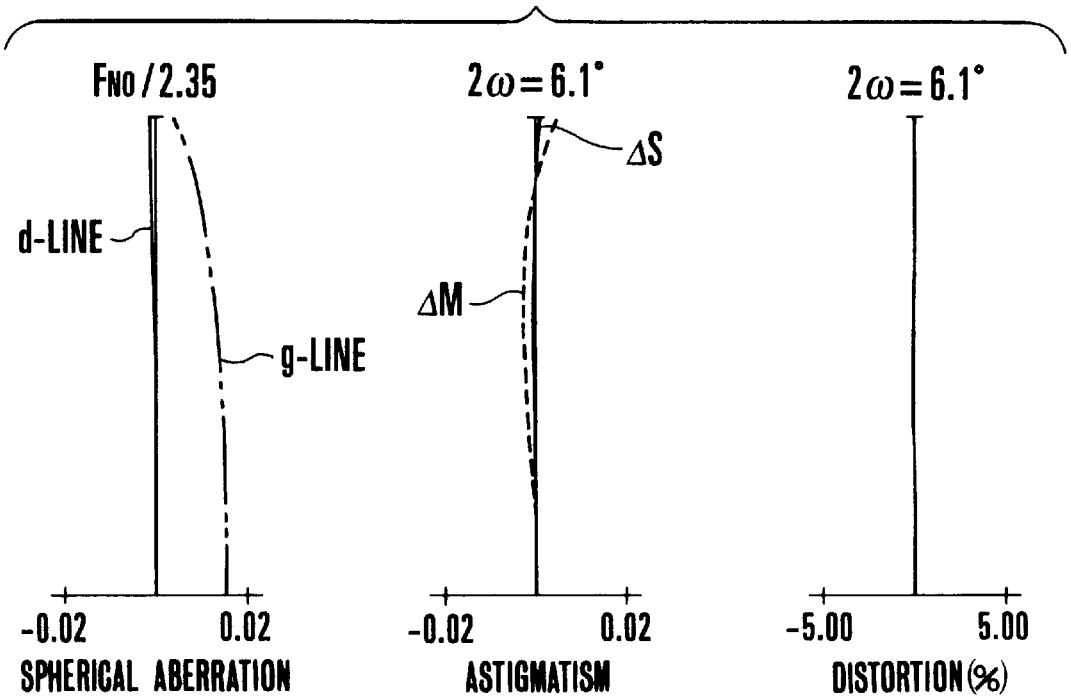
Figure 11:
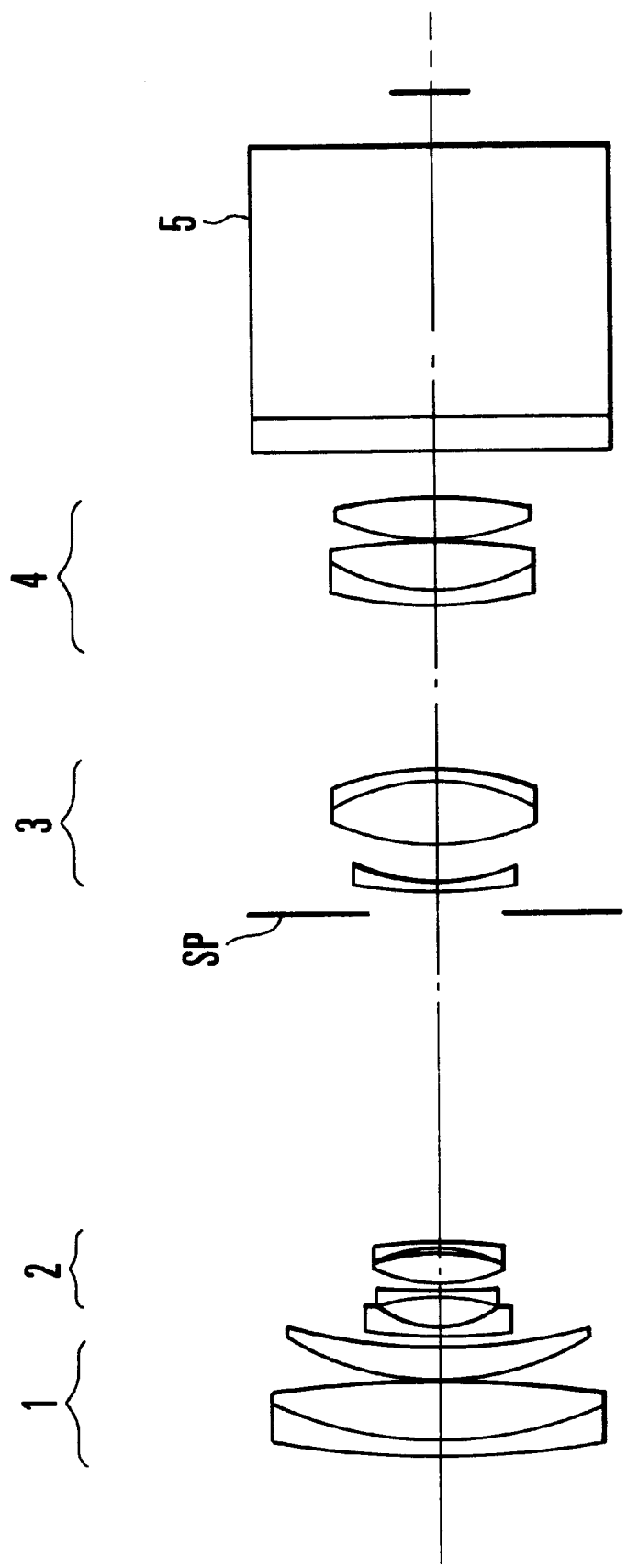
FIG. 11 is a lens block diagram of a numerical example 6 of the invention.
Figure 12A:
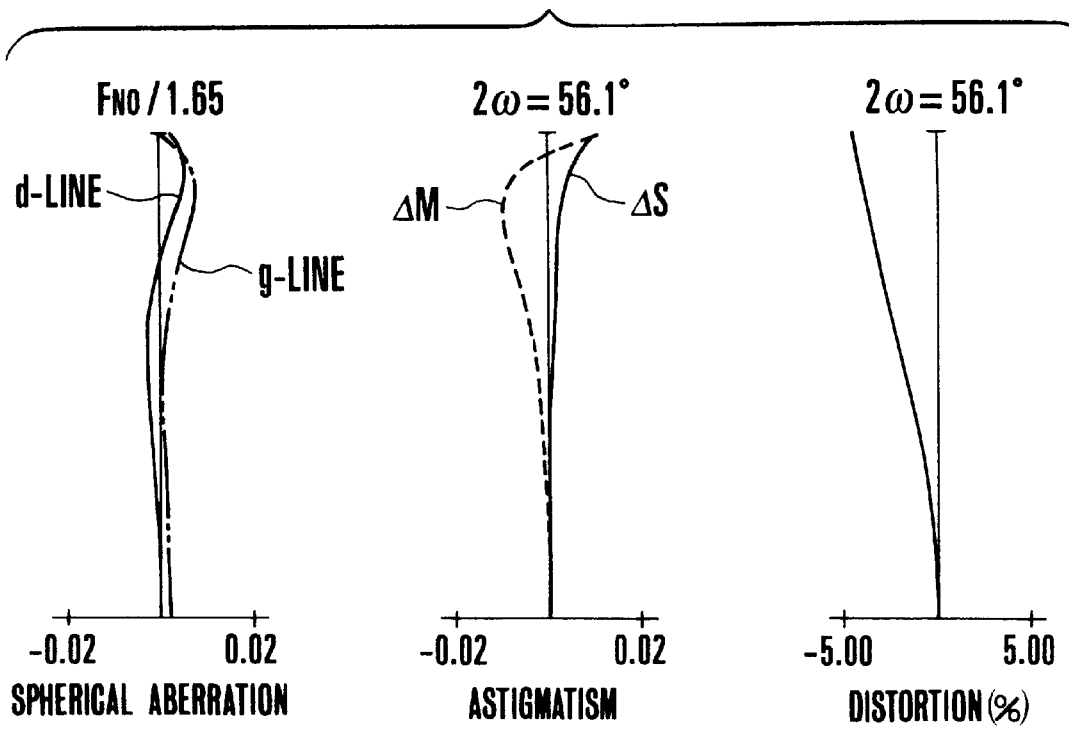
FIGS. 12(A) and 12(B) are graphic representations of the aberrations of the numerical example 6 of the invention.
Figure 12B:
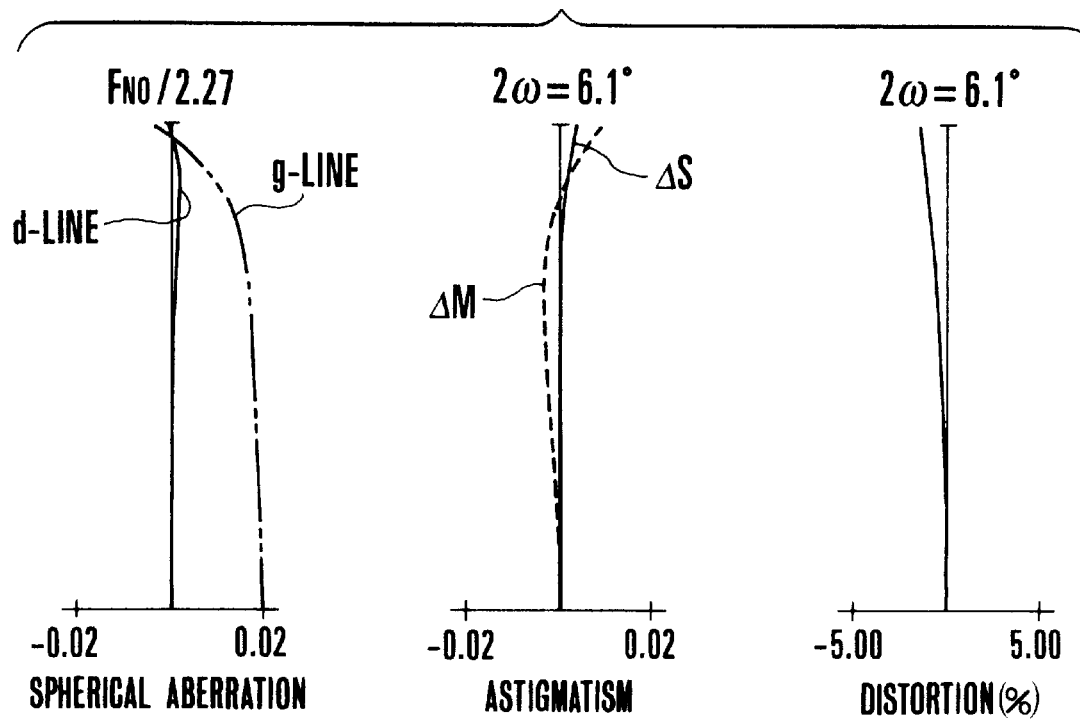

FIG. 1 in longitudinal section view shows a numerical example 1 of a zoom lens of the invention, comprising a first lens unit 1 having a positive refractive power and fixed, a second lens unit 2 having a negative refractive power and axially movable for varying the focal length, a third lens unit 3 having a positive or negative refractive power and fixed, and a fourth lens unit 4 having a positive refractive power and axially movable for compensating for the image shift with zooming. There is also an equivalent 5 of various optical members. This may be removed. SP stands for an aperture stop.

In the embodiment, the fourth lens unit is moved not only to compensate for the image shift with zooming, but also to perform focusing. Particularly, the locus the fourth lens unit depicts when axially moving from the wide-angle end to the telephoto end is made convex toward the object side. This permits the air space between the third and fourth lens units to be used efficiently. Thus, a shortening of the total length of the entire system is advantageously achieved.

In the embodiment, for example, with the setting to the telephoto end, when focusing from an infinitely distant object to an object at a minimum distance, it is forward that the fourth lens unit moves.

In the embodiment, as compared with the conventional 4-unit zoom lens in which the first lens unit is moved forward to effect focusing, the use of the rear focus type leads to an advantage of preventing the effective diameter of the first lens unit increasing.

Other features are that the third lens unit is made up from at least one negative lens and at least one positive lens, wherein the frontmost lens in the third lens unit is the negative lens and that the stop is positioned just in front of the third lens unit, wherein it is preferred that the first and third lens units remain stationary during zooming. Such a form of the third lens unit with the negative lens at the frontmost position gives assurance of sufficient elongation of the long back focal distance and eye relief, and such an arrangement of the stop at the most object side of the third lens unit shortens the front section ahead of the stop, thus minimizing the diameter of the front lens members.

Still another feature is that the frontmost or negative lens in the third lens unit has its rear surface made concave toward the image side and stronger in curvature than the opposite or front surface. Such a form of the frontmost lens cancels the spherical aberrations produced when the emerging light beam enters the next lens, as this light beam is diverged because the frontmost is made negative to elongate the back focal distance and eye relief.

It is recommended that for the wide-angle end and the infinite object distance, the back focal distance BFw is also made to lie within the following range:

$$2.0 < BFw/Fw < 6.0 \quad (1)$$

where Fw is the overall focal length for the wide-angle end of the first to fourth lens units.

A further feature is that the fourth lens unit is preferably constructed with at least one negative lens and at least two positive lenses.

Again, it is desirable that the fourth lens unit comprises, from front to rear, a negative first lens whose rear surface is concave toward the image side and stronger in refracting power than the opposite surface, a positive second lens whose both surfaces are convex and a positive third lens.

On the other hand, it is desirable to satisfy one or more of the following conditions:

$$1.5 < F_3/F_4 < 20 \quad (2)$$

$$-0.5 < Ft/Fat < 0.5 \quad (3)$$

$$-2 < Fw/F_2 < -0.25 \quad (4)$$

where $F_2$, $F_3$ and $F_4$ are the focal lengths of the second, third and fourth lens units, respectively, Ft is the overall focal length for the telephoto end of the first to fourth lens units, and Fat is the overall focal length for the telephoto end of the first to third lens units.

The significance of each of the above-described conditions in respect to its limits is explained below. The condition (1) is to regulate the back focal distance. When the lower limit of this condition is exceeded, as it means that the back focal distance is too short, the color separation prism or like optical members cannot be disposed, and the eye relief becomes so short that a large departure from the telecentric system results. With this, the light rays are incident on the prism at a tighter angle, causing the color shading to increase to as high a level as one cannot ignore. Conversely when the upper limit is too long as exceeding the upper limit, the fourth lens unit becomes a large effective diameter. Because this lens unit is so heavy, a problem arises in that it is impossible to perform smooth focusing.

More desirably, $$2.5 < BFw/Fw < 5.0$$

is to be satisfied. Such narrowing of the range by either or both of the upper and lower limits is useful for elongating the back focal distance and the eye relief and for improving the compact form.

The condition (2) is concerned with the focal lengths of the third and fourth lens units and has an aim to achieve improvements of the compact form of the section between the stop and the rear vertex in such a manner that the back focal distance and the eye relief are long enough and good stability of optical performance is maintained.

When the lower limit of the condition (2) is exceeded, as this implies that the focal length is too short, it becomes difficult to correct the variation of spherical aberration with zooming or focusing. Other problems arise in that it becomes difficult to assure sufficient elongation of the back focal distance, that when in the middle focal length position, the eye relief is liable to be short, and that the range of movement of the fourth lens unit increases to increase the range of variation of aberrations with zooming or focusing. Conversely when the upper limit is exceeded, as this implies that the focal length of the third lens unit is too long, the light rays emerging from the third lens unit diverge to a great degree. To admit of this, the effective diameter of the fourth lens unit increases so that this becomes very heavy. Therefore, it becomes difficult to perform smooth focusing.

The condition (3) is concerned with the parallelism (afocal degree) of the on-axial light beam emerging from the third lens unit. When the upper limit is exceeded, as this implies that the degree of convergence of the on-axial light beam is too strong, astigmatism becomes large with focusing to an object at the minimum distance and the meridional image focus is under-corrected with a high possibility. Conversely when the lower limit is exceeded, as this implies that the degree of divergence of the on-axial light beam is too strong, the height of incidence on the fourth lens unit becomes high, giving rise to a problem that large spherical aberration is produced.

The condition (4) is to regulate the focal length of the second lens unit. When the upper limit of this condition is exceeded, as this implies that the focal length of the second lens unit is too short, large under-correction of Petzval sum results. So, the inclination of the image surface and other aberrations become difficult to correct. Conversely, when the focal length of the second lens unit is too long so as to exceed the lower limit, the total zooming movement increases greatly, giving rise to a problem that the diameter of the front lens members becomes much too large.

As described above, the condition (2), (3) or (4) is set forth to simultaneously fulfill the requirements of increasing the back focal distance and the eye relief and of obtaining good optical performance. To attain further improved results, it is recommended to narrow the ranges by altering either or both of the upper and lower limits as follows:

$$1.5 < F_3/F_4 < 15$$

$$-0.5 < Ft/Fat < 0.3$$

$$-1.2 < Fw/F_2 < -0.3$$

Otherwise from the above, the back focal distance and the eye relief can be made long enough. To this purpose, it is more preferred to satisfy the following conditions:

$$0.3 < D_{34t}/\sqrt{Fw \cdot Ft} < 1.5 \quad (5)$$

$$-6 < F_1/F_2 < -3 \quad (6)$$

where $D_{34t}$ is the axial separation between the third and fourth lens units for the telephoto end and infinity, Fw and Ft are the shortest and longest focal lengths of the entire system, respectively, and $F_1$ and $F_2$ are the focal lengths of the first and second lens units, respectively.

The condition (5) is concerned with the axial separation between the third and fourth lens units for the telephoto end and infinity. When the separation between the third and fourth lens units is wider than the upper limit of the condition (5), the height of incidence of the off-axial light beam on the fourth lens unit becomes higher so as to increase the difficulty of aberration correction. Another problem even arises in that the fourth lens unit gets a larger effective diameter. Conversely when the separation is narrower than the lower limit, a problem arises in that it becomes difficult to secure the forward movement of the fourth lens unit for closest focusing.

The condition (6) is concerned with the focal lengths of the first and second lens units and has an aim to achieve improvements of the compact form in such a manner that the back focal distance is long and good stability of optical performance is maintained. When the lower limit of the condition (6) is exceeded, as this implies that the focal length of the second lens unit is too long and the focal length of the first lens unit is too short, the total movement of the second lens unit increases to increase the difficulty of minimization of the total length and the diameter of the front lens members. Moreover, as nearing the telephoto end, the moving speed of the fourth lens unit becomes faster. So, the range of variation of aberrations with zooming tends to increase. Conversely when the upper limit is exceeded, it becomes difficult to correct distortion and other aberrations well.

With this regard, it is desirable to alter the conditions (5) and (6) as follows:

$$0.3 < D_{34t}/\sqrt{Fw \cdot Ft} < 1.2$$

$$-5.5 < F_1/F_2 < -3.5$$

When these conditions are satisfied, the performance is further improved.

To simultaneously fulfill the requirements of further improving the optical performance, of facilitating sufficient elongation of the back focal distance and the eye relief and of minimize the bulk and size, it is more desirable that the factors in the above-described conditions (1) to (6) fall within the following ranges:

$$3.0 < BFw/Fw < 4.5$$

-continued $$1.8 < F_3/F_4 < 10$$

$$-0.2 < Ft/Fat < 0.1$$

$$-0.8 < Fw/F_2 < -0.4$$

$$0.3 < D_{34t}/\sqrt{Fw \cdot Ft} < 1.2$$

$$-5.2 < F_1/F_2 < -4.0$$

Next, numerical examples 1 to 6 of the invention are shown. In the numerical data for the examples 1 to 6, Ri is the radius of curvature of the i-th lens surface, when counted from the object side, Di is the i-th axial thickness or air separation, when counted from the object side, and Ni and vi are respectively the refractive index and Abbe number of the glass of the i-th lens element, when counted from the object side.

In the numerical example 1, R27-R29 represent optical filters, face plates or the like.

The shape of an aspheric surface is expressed in the coordinates with an X axis in the axial direction and an H axis in the direction perpendicular to an optical axis, the direction in which light advances being taken as positive, by the following equation:

$$X = (1/R)H^2 / \left(1 + \sqrt{(1-(1+k)(H/R)^2)}\right) + BH^4 + CH^6 + DH^8 + EH^{10} + FH^{12}$$

where R is the radius of the osculating sphere, and B, C, D, E and F are the aspheric coefficients.

The values of the factors in the above-described conditions (1) to (6) for the numerical examples 1 to 6 are listed in Table-1.

| Numerical Example 1: | | | | |
|---|---|---|---|---|
| f = 1–10.00 | | Fno. = 1.65–2.13 | 2ω = 57.0°~6.2° | |
| R1 = | 11.304 | D1 = 0.24 | N1 = 1.846660 | v1 = 23.8 |
| R2 = | 5.169 | D2 = 0.95 | N2 = 1.603112 | v2 = 60.7 |
| R3 = | -33.966 | D3 = 0.03 | | |
| R4 = | 4.381 | D4 = 0.56 | N3 = 1.712995 | v3 = 53.8 |
| R5 = | 11.713 | D5 = Variable | | |
| R6 = | 6.932 | D6 = 0.10 | N4 = 1.882997 | v4 = 40.8 |
| R7 = | 1.184 | D7 = 0.46 | | |
| R8 = | -2.573 | D8 = 0.10 | N5 = 1.882997 | v5 = 40.8 |
| R9 = | 5.649 | D9 = 0.13 | | |
| R10 = | 3.439 | D10 = 0.42 | N6 = 1.846660 | v6 = 23.8 |
| R11 = | -3.091 | D11 = 0.04 | | |
| R12 = | -2.453 | D12 = 0.12 | N7 = 1.804000 | v7 = 46.6 |
| R13 = | -4.999 | D13 = Variable | | |
| R14 = | (Stop) | D14 = 0.34 | | |
| R15 = | 6.451 | D15 = 0.14 | N8 = 1.603112 | v8 = 60.7 |
| R16 = | 3.203 | D16 = 0.47 | | |
| R17 = | 4.027 | D17 = 1.03 | N9 = 1.603420 | v9 = 38.0 |
| R18 = | -2.134 | D18 = 0.15 | N10 = 1.834807 | v10 = 42.7 |
| R19 = | -5.089 | D19 = Variable | | |
| R20 = | -4.597 | D20 = 0.42 | N11 = 1.516330 | v11 = 64.2 |
| R21 = | -3.121 | D21 = 0.03 | | |
| R22 = | 7.105 | D22 = 0.15 | N12 = 1.846660 | v12 = 23.8 |
| R23 = | 2.504 | D23 = 0.69 | N13 = 1.487490 | v13 = 70.2 |
| R24 = | -12.109 | D24 = 0.03 | | |
| R25 = | 3.316 | D25 = 0.56 | N14 = 1.496999 | v14 = 81.6 |
| R26 = | -35.722 | D26 = 0.68 | | |
| R27 = | ∞ | D27 = 0.51 | N15 = 1.516330 | v15 = 64.2 |
| R28 = | ∞ | D28 = 3.22 | N16 = 1.603420 | v16 = 38.0 |
| R29 = | ∞ | | | |

-continued

| Variable Separations | Focal Length | | |
|---|---|---|---|
| | 1.00 | 4.69 | 10.00 |
| D5 | 0.15 | 3.31 | 4.20 |
| D13 | 4.31 | 1.15 | 0.26 |
| D19 | 2.05 | 1.40 | 2.05 |

Numerical Example 2:
f = 1–12.05    Fno. = 1.65–2.00    2ω = 65.2°–6.1°

| R1 = | 30.571 | D1 = 0.36 | N1 = 1.805181 | ν1 = 25.4 |
|---|---|---|---|---|
| R2 = | 7.287 | D2 = 0.40 | | |
| R3 = | 12.246 | D3 = 1.00 | N2 = 1.696797 | ν2 = 55.5 |
| R4 = | −32.680 | D4 = 0.04 | | |
| R5 = | 5.945 | D5 = 1.10 | N3 = 1.696797 | ν3 = 55.5 |
| R6 = | −1305.780 | D6 = Variable | | |
| R7 = | 8.578 | D7 = 0.16 | N4 = 1.882997 | ν4 = 40.8 |
| R8 = | 1.772 | D8 = 0.68 | | |
| R9 = | −2.647 | D9 = 0.14 | N5 = 1.696797 | ν5 = 55.5 |
| R10 = | 3.033 | D10 = 0.20 | | |
| R11 = | 3.638 | D11 = 0.46 | N6 = 1.846659 | ν6 = 23.8 |
| R12 = | −17.452 | D12 = Variable | | |
| R13 = | (Stop) | D13 = 0.30 | | |
| R14 = | −14.240 | D14 = 0.14 | N7 = 1.603112 | ν7 = 60.7 |
| R15 = | 4.595 | D15 = 0.26 | | |
| R16 = | −9.032 | D16 = 0.40 | N8 = 1.603420 | ν8 = 38.0 |
| R17 = | −4.333 | D17 = 0.60 | | |
| R18 = | 4.101 | D18 = 1.14 | N9 = 1.603420 | ν9 = 38.0 |
| R19 = | −2.568 | D19 = 0.18 | N10 = 1.785896 | ν10 = 44.2 |
| R20 = | −9.589 | D20 = Variable | | |
| R21 = | −11.910 | D21 = 0.50 | N11 = 1.516330 | ν11 = 64.2 |
| R22 = | −4.499 | D22 = 0.03 | | |
| R23 = | 11.430 | D23 = 0.18 | N12 = 1.805181 | ν12 = 25.4 |
| R24 = | 2.474 | D24 = 1.04 | N13 = 1.487490 | ν13 = 70.2 |
| R25 = | −22.902 | D25 = 0.03 | | |
| R26 = | 4.228 | D26 = 0.68 | N14 = 1.487490 | ν14 = 70.2 |
| R27 = | −10.421 | D27 = 0.80 | | |
| R28 = | ∞ | D28 = 0.50 | N15 = 1.516330 | ν15 = 64.2 |
| R29 = | ∞ | D29 = 4.00 | N16 = 1.603420 | ν16 = 38.0 |
| R30 = | ∞ | | | |

| Variable Separations | Focal Length | | |
|---|---|---|---|
| | 1.00 | 5.18 | 12.05 |
| D6 | 0.29 | 4.50 | 5.68 |
| D12 | 5.70 | 1.49 | 0.30 |
| D20 | 1.82 | 1.07 | 1.83 |

Numerical Example 3:
f = 1–8.00    Fno. = 1.65–1.66    2ω = 57.0°–7.8°

| R1 = | 9.761 | D1 = 0.31 | N1 = 1.805181 | ν1 = 25.4 |
|---|---|---|---|---|
| R2 = | 5.256 | D2 = 0.92 | N2 = 1.603112 | ν2 = 60.7 |
| R3 = | 57.424 | D3 = 0.03 | | |
| R4 = | 5.401 | D4 = 0.56 | N3 = 1.696797 | ν3 = 55.5 |
| R5 = | 14.080 | D5 = Variable | | |
| R6 = | 6.645 | D6 = 0.15 | N4 = 1.882997 | ν4 = 40.8 |
| R7 = | 1.421 | D7 = 0.59 | | |
| R8 = | −7.409 | D8 = 0.14 | N5 = 1.696797 | ν5 = 55.5 |
| R9 = | 3.189 | D9 = 0.17 | | |
| R10 = | 2.673 | D10 = 0.42 | N6 = 1.846659 | ν6 = 23.8 |
| R11 = | 19.595 | D11 = Variable | | |
| R12 = | (Stop) | D12 = 0.25 | | |
| R13 = | 16.350 | D13 = 0.15 | N7 = 1.804000 | ν7 = 46.6 |
| R14 = | 1.864 | D14 = 0.64 | N8 = 1.603420 | ν8 = 38.0 |
| R15 = | −5.938 | D15 = Variable | | |
| R16 = | −90.332 | D16 = 0.42 | N9 = 1.487490 | ν9 = 70.2 |
| R17 = | −4.286 | D17 = 0.03 | | |
| R18 = | 8.585 | D18 = 1.17 | N10 = 1.805181 | ν10 = 25.4 |
| R19 = | 2.707 | D19 = 0.58 | N11 = 1.487490 | ν11 = 70.2 |
| R20 = | −19.125 | D20 = 0.03 | | |
| R21 = | 3.893 | D21 = 0.54 | N12 = 1.487490 | ν12 = 70.2 |
| R22 = | −5.134 | D22 = 0.68 | | |
| R23 = | ∞ | D23 = 0.42 | N13 = 1.516330 | ν13 = 64.2 |
| R24 = | ∞ | D24 = 3.39 | N14 = 1.603420 | ν14 = 38.0 |
| R25 = | ∞ | | | |

| Variable Separations | Focal Length | | |
|---|---|---|---|
| | 1.00 | 4.29 | 8.00 |
| D5 | 0.17 | 4.10 | 5.20 |
| D11 | 5.29 | 1.36 | 0.25 |
| D15 | 2.25 | 1.90 | 2.25 |

Aspheric Coefficients for R15:

K = −4.80199 × 10⁻¹    B = 1.00274 × 10⁻³    C = −9.99663 × 10⁻⁴
D = −1.09035 × 10⁻⁴    E = 1.94716 × 10⁻⁴

Numerical Example 4:
f = 1–10.00    Fno. = 1.65–2.33    2ω = 56.1°–6.1°

| R1 = | 12.685 | D1 = 0.20 | N1 = 1.846660 | ν1 = 23.8 |
|---|---|---|---|---|
| R2 = | 5.675 | D2 = 0.83 | N2 = 1.603112 | ν2 = 60.7 |
| R3 = | −33.085 | D3 = 0.03 | | |
| R4 = | 4.668 | D4 = 0.47 | N3 = 1.712995 | ν3 = 53.8 |
| R5 = | 11.792 | D5 = Variable | | |
| R6 = | 6.964 | D6 = 0.10 | N4 = 1.882997 | ν4 = 40.8 |
| R7 = | 1.263 | D7 = 0.47 | | |
| R8 = | −3.174 | D8 = 0.10 | N5 = 1.882997 | ν5 = 40.8 |
| R9 = | 8.392 | D9 = 0.12 | | |
| R10 = | 3.188 | D10 = 0.42 | N6 = 1.846660 | ν6 = 23.8 |
| R11 = | −3.671 | D11 = 0.05 | | |
| R12 = | −2.708 | D12 = 0.10 | N7 = 1.772499 | ν7 = 49.6 |
| R13 = | −9.576 | D13 = Variable | | |
| R14 = | (Stop) | D14 = 0.33 | | |
| R15 = | 8.699 | D15 = 0.13 | N.8 = 1.603112 | ν8 = 60.7 |
| R16 = | 3.003 | D16 = 0.50 | | |
| R17 = | 3.874 | D17 = 0.97 | N9 = 1.603420 | ν9 = 38.0 |
| R18 = | −2.061 | D18 = 0.15 | N10 = 1.834807 | ν10 = 42.7 |
| R19 = | −5.583 | D19 = Variable | | |
| R20 = | −4.652 | D20 = 0.33 | N11 = 1.516330 | ν11 = 64.2 |
| R21 = | −2.964 | D21 = 0.03 | | |
| R22 = | 7.735 | D22 = 0.15 | N12 = 1.846660 | ν12 = 23.8 |
| R23 = | 2.649 | D23 = &.75 | N13 = 1.487490 | ν13 = 70.2 |
| R24 = | −10.873 | D24 = 0.02 | | |
| R25 = | 3.494 | D25 = 0.50 | N14 = 1.516330 | ν14 = 64.2 |
| R26 = | −29.431 | D26 = 0.67 | | |
| R27 = | ∞ | D27 = 0.42 | N15 = 1.516330 | ν15 = 64.2 |
| R28 = | ∞ | D28 = 4.00 | N16 = 1.603420 | ν16 = 38.0 |
| R29 = | ∞ | | | |

| Variable Separations | Focal Length | | |
|---|---|---|---|
| | 1.00 | 4.88 | 10.00 |
| D5 | 0.21 | 3.72 | 4.71 |
| D13 | 4.67 | 1.16 | 0.17 |
| D19 | 1.98 | 1.33 | 1.98 |

Numerical Example 5:
f = 1–10.00    Fno. = 1.65–2.35    2ω = 56.1°–6.1°

| R1 = | 11.963 | D1 = 0.20 | N1 = 1.846660 | ν1 = 23.8 |
|---|---|---|---|---|
| R2 = | 5.577 | D2 = 0.83 | N2 = 1.603112 | ν2 = 60.7 |
| R3 = | −32.735 | D3 = 0.03 | | |
| R4 = | 4.708 | D4 = 0.47 | N3 = 1.712995 | ν3 = 53.8 |
| R5 = | 11.383 | D5 = Variable | | |
| R6 = | 5.936 | D6 = 0.10 | N4 = 1.882997 | ν4 = 40.8 |
| R7 = | 1.263 | D7 = 0.48 | | |
| R8 = | −3.161 | D8 = 0.10 | N5 = 1.882997 | ν5 = 40.8 |
| R9 = | 9.936 | D9 = 0.12 | | |
| R10 = | 3.118 | D10 = 0.42 | N6 = 1.846660 | ν6 = 23.8 |
| R11 = | −3.664 | D11 = 0.05 | | |
| R12 = | −2.699 | D12 = 0.10 | N7 = 1.772499 | ν7 = 49.6 |
| R13 = | −15.296 | D13 = Variable | | |
| R14 = | (Stop) | D14 = 0.33 | | |
| R15 = | 8.688 | D15 = 0.13 | N8 = 1.603112 | ν8 = 60.7 |
| R16 = | 3.001 | D16 = 0.50 | | |
| R17 = | 3.873 | D17 = 0.97 | N9 = 1.603420 | ν9 = 38.0 |
| R18 = | −2.062 | D18 = 0.15 | N10 = 1.834807 | ν10 = 42.7 |
| R19 = | −5.553 | D19 = Variable | | |
| R20 = | −4.663 | D20 = 0.33 | N11 = 1.516330 | ν11 = 64.2 |
| R21 = | −2.972 | D21 = 0.03 | | |
| R22 = | 7.814 | D22 = 0.15 | N12 = 1.846660 | ν12 = 23.8 |
| R23 = | 2.629 | D23 = 0.75 | N13 = 1.487490 | ν13 = 70.2 |

-continued

| | | | |
|---|---|---|---|
| R24 = −10.796 | D24 = 0.03 | | |
| R25 = 3.525 | D25 = 0.50 | N14 = 1.516330 | ν14 = 64.2 |
| R26 = −23.335 | D26 = 0.67 | | |
| R27 = ∞ | D27 = 0.42 | N15 = 1.516330 | ν15 = 64.2 |
| R28 = ∞ | D28 = 4.00 | N16 = 1.603420 | ν16 = 38.0 |
| R29 = ∞ | | | |

| Variable | Focal Length | | |
|---|---|---|---|
| Separations | 1.00 | 4.89 | 10.00 |
| D5 | 0.15 | 3.67 | 4.66 |
| D13 | 4.67 | 1.16 | 0.17 |
| D19 | 1.93 | 1.29 | 1.93 |

Numerical Example 6:
f = 1–10.00    Fno. = 1.65–2.27    2ω = 56.1°–6.1°

| | | | |
|---|---|---|---|
| R1 = 10.434 | D1 = 0.20 | N1 = 1.846660 | ν1 = 23.8 |
| R2 = 5.187 | D2 = 0.83 | N2 = 1.603112 | ν2 = 60.7 |
| R3 = −33.724 | D3 = 0.03 | | |
| R4 = 4.111 | D4 = 0.47 | N3 = 1.721995 | ν3 = 53.8 |
| R5 = 7.644 | D5 = Variable | | |
| R6 = 5.489 | D6 = 0.10 | N4 = 1.882997 | ν4 = 40.8 |
| R7 = 1.156 | D7 = 0.52 | | |
| R8 = −2.623 | D8 = 0.10 | N5 = 1.882997 | ν5 = 40.8 |
| R9 = 7.551 | D9 = 0.12 | | |
| R10 = 3.512 | D10 = 0.42 | N6 = 1.846660 | ν6 = 23.8 |
| R11 = −3.829 | D11 = 0.04 | | |
| R12 = −3.023 | D12 = 0.10 | N7 = 1.772499 | ν7 = 49.6 |
| R13 = −5.204 | D13 = Variable | | |
| R14 = (Stop) | D14 = 0.33 | | |
| R15 = 14.873 | D15 = 0.13 | N8 = 1.603112 | ν8 = 60.7 |
| R16 = 2.725 | D16 = 0.50 | | |
| R17 = 3.742 | D17 = 0.92 | N9 = 1.603420 | ν9 = 38.0 |
| R18 = −3.099 | D18 = 0.15 | N10 = 1.834807 | ν10 = 42.7 |
| R19 = −4.747 | D19 = Variable | | |
| R20 = 10.079 | D20 = 0.15 | N11 = 1.846660 | ν11 = 23.8 |
| R21 = 2.618 | D21 = 0.75 | N12 = 1.487490 | ν12 = 70.2 |
| R22 = −7.647 | D22 = 0.02 | | |
| R23 = 3.948 | D23 = 0.62 | N13 = 1.516330 | ν13 = 64.2 |
| R24 = −6.353 | D24 = 0.67 | | |
| R25 = ∞ | D25 = 0.42 | N14 = 1.516330 | ν14 = 64.2 |
| R26 = ∞ | D26 = 4.00 | N15 = 1.603420 | ν15 = 38.0 |
| R27 = ∞ | | | |

| Variable | Focal Length | | |
|---|---|---|---|
| Separations | 1.00 | 4.69 | 10.00 |
| D5 | 0.15 | 3.67 | 4.66 |
| D13 | 4.67 | 1.16 | 0.17 |
| D19 | 2.38 | 1.78 | 2.38 |

TABLE 1

| Condition | Numerical Example | | | | | |
|---|---|---|---|---|---|---|
| No. | 1 | 2 | 3 | 4 | 5 | 6 |
| (1) | 3.732 | 4.455 | 3.308 | 4.106 | 4.089 | 4.104 |
| (2) | 1.989 | 2.065 | 6.827 | 2.492 | 3.268 | 2.072 |
| (3) | 0.028 | 0.056 | −0.169 | −0.110 | −0.108 | 0.043 |
| (4) | −0.702 | −0.588 | −0.492 | −0.760 | −0.632 | −0.632 |
| (5) | 0.647 | 0.528 | 0.794 | 0.598 | 0.612 | 0.752 |
| (6) | −4.722 | −4.908 | −4.337 | −4.657 | −4.657 | −4.657 |

Incidentally, in the graphic representations, the aberrations are shown in the wide-angle end (A) and the telephoto end (B).

As described above, the invention has realized good correction of aberrations as shown in the graphic representations. Thus, a zoom lens of the rear focus type having a long back focal distance and a far off eye relief with a large relative aperture can be achieved.

Next, paying attention particularly to the fourth lens unit, another embodiment of the invention will be described.

Figure 13:
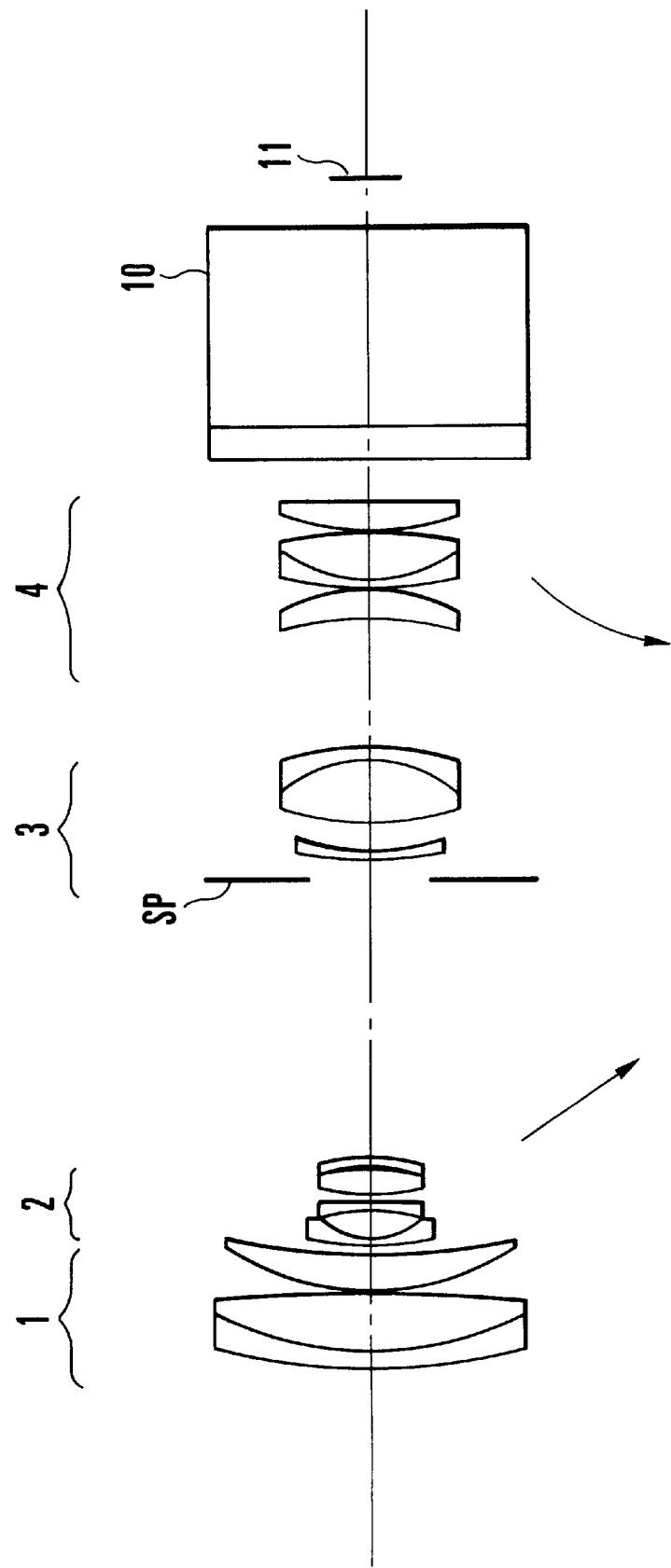
FIG. 13 is a lens block diagram of a numerical example 7 of the invention.
Figure 14A:
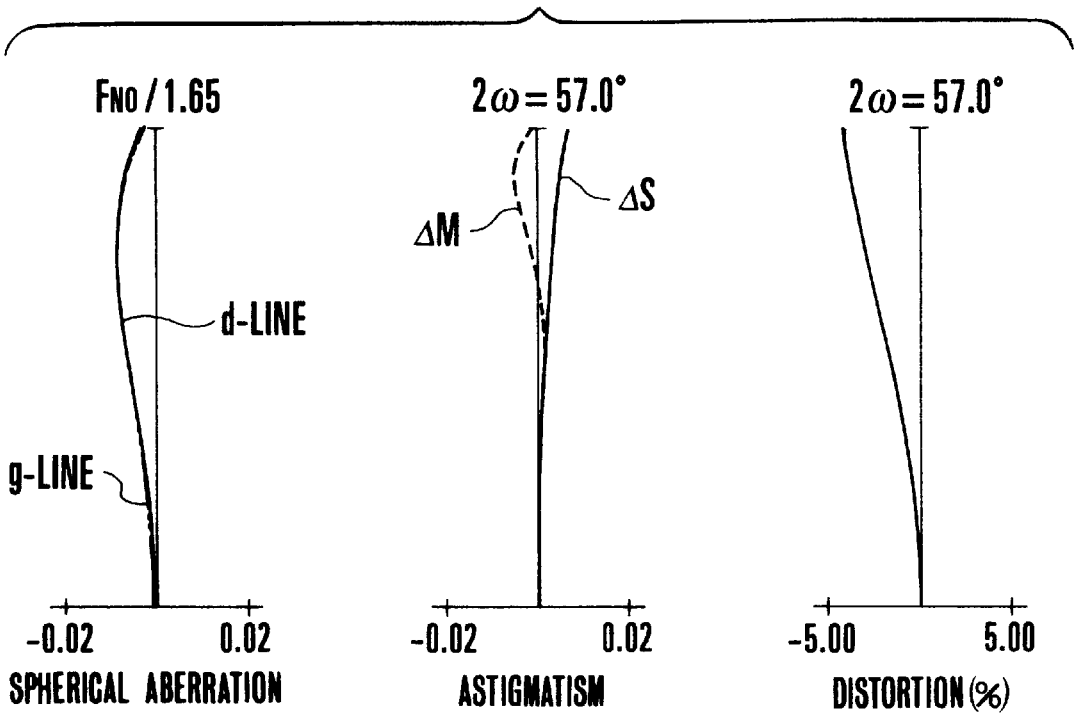
FIGS. 14(A) and 14(B) are graphic representations of the aberrations of the numerical example 7 of the invention.
Figure 14B:
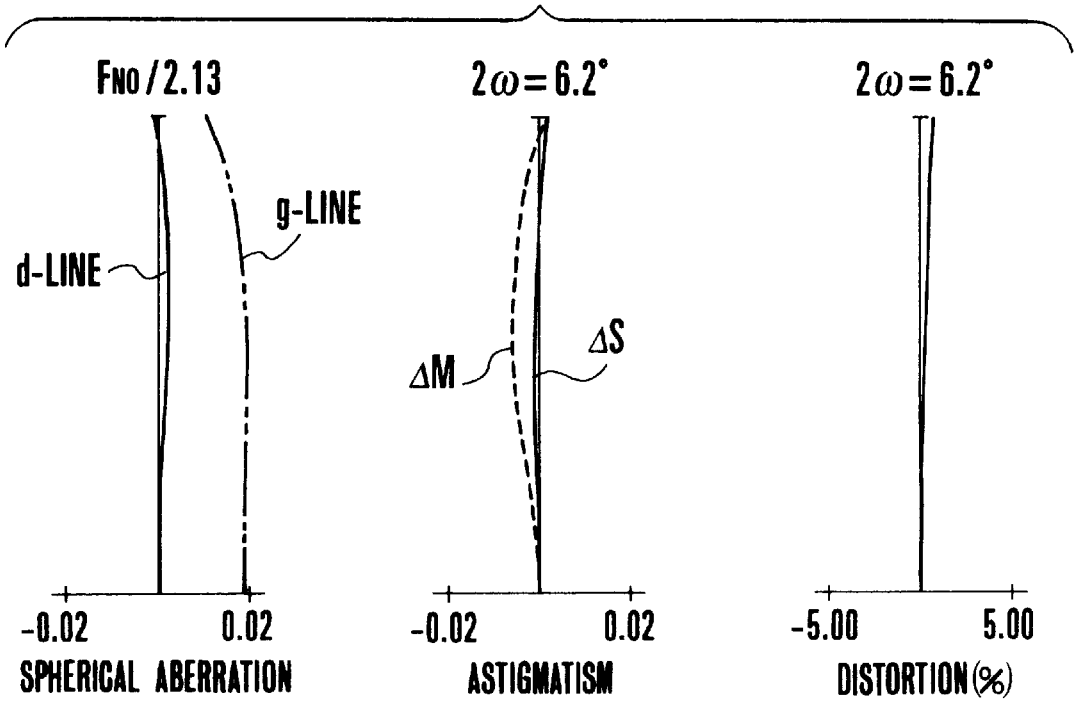
Figure 16A:
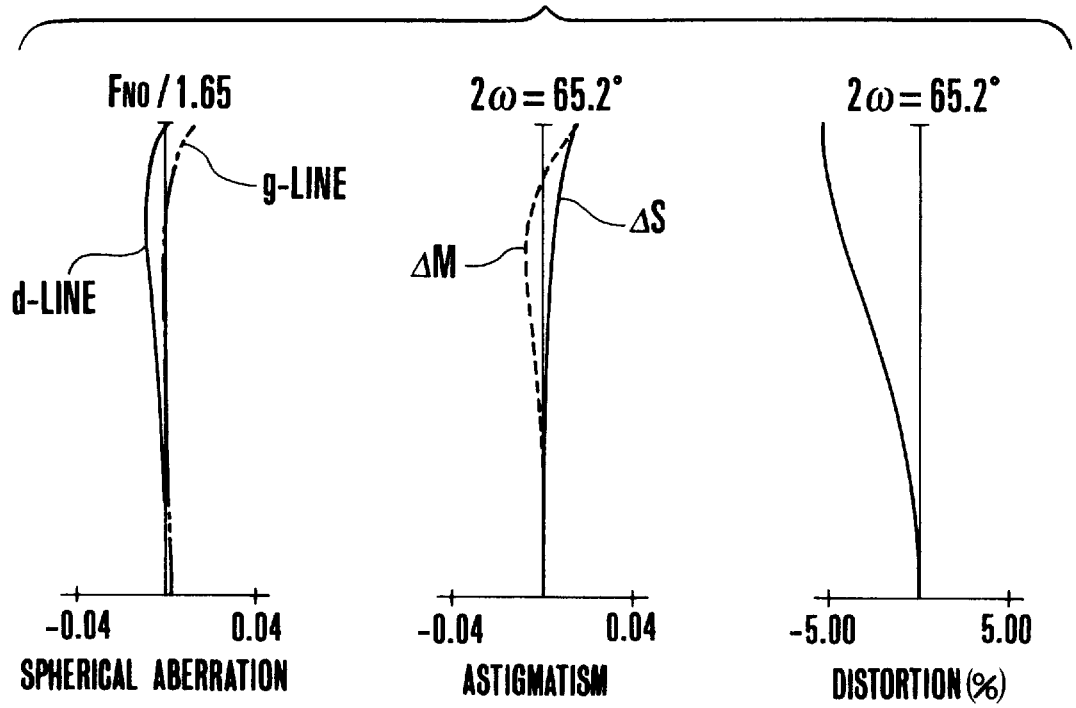
FIGS. 16(A) and 16(B) are graphic representations of the aberrations of the numerical example 8 of the invention.
Figure 16B:
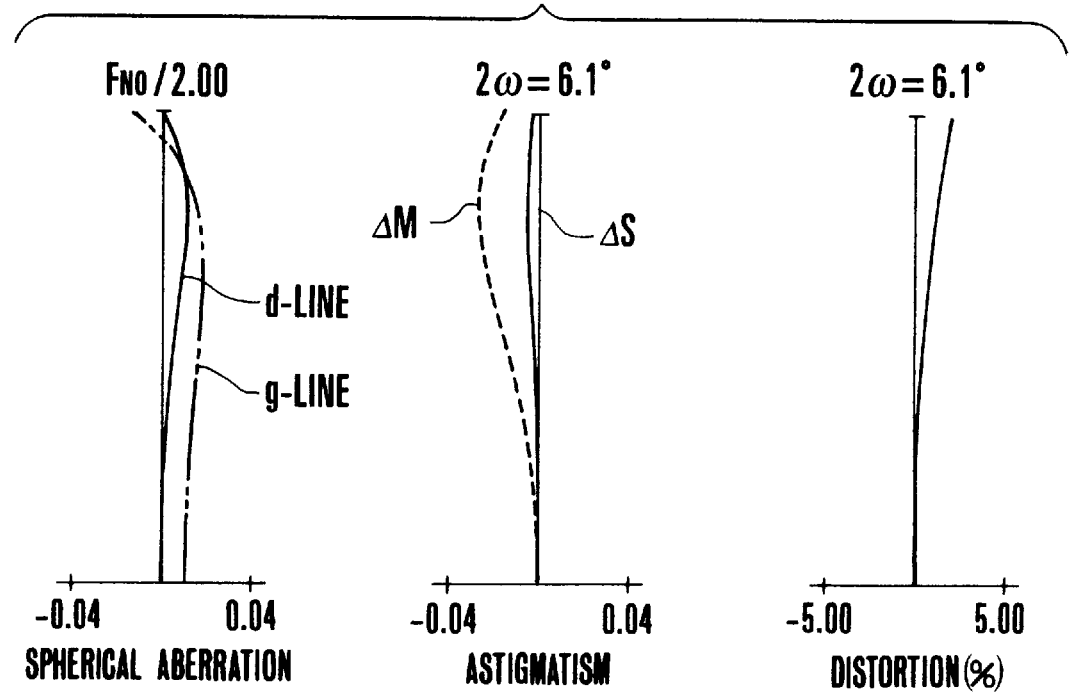
Figure 17:
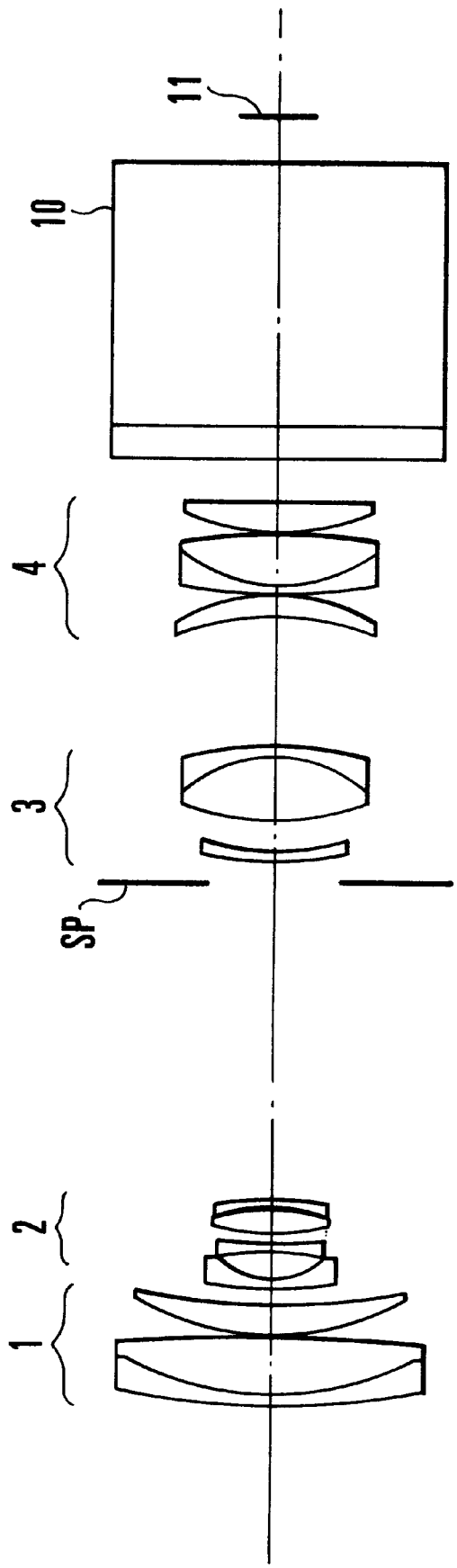
FIG. 17 is a lens block diagram of a numerical example 9 of the invention.
Figure 18A:
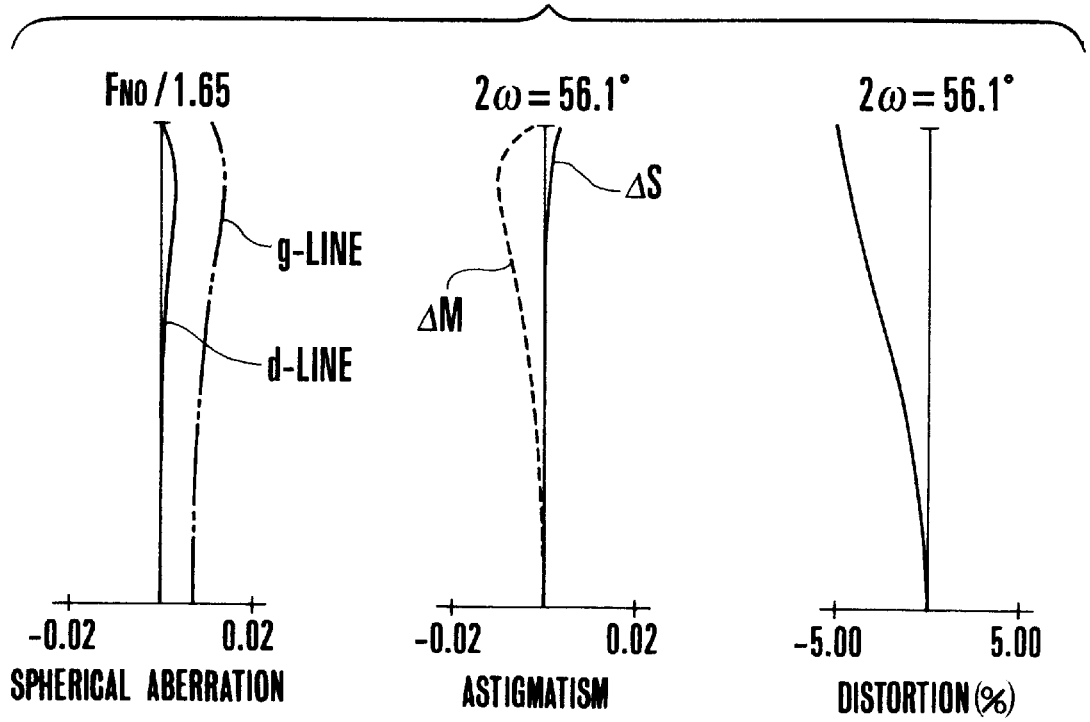
FIGS. 18(A) and 18(B) are graphic representations of the aberrations of the numerical example 9 of the invention.
Figure 18B:
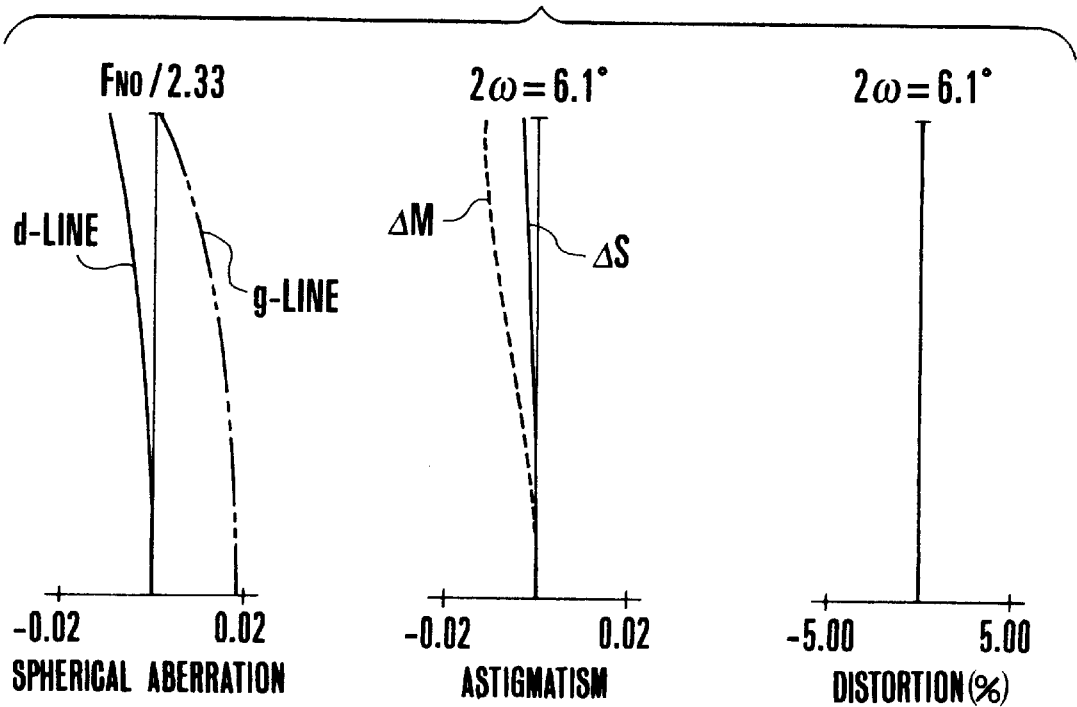
Figure 19:
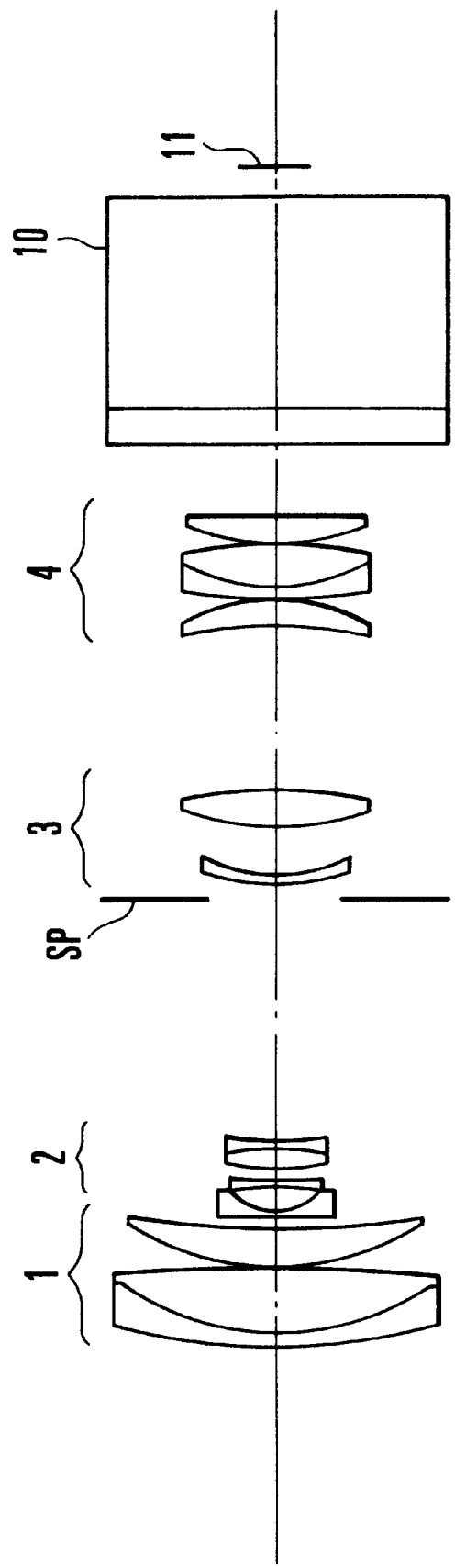
FIG. 19 is a lens block diagram of a numerical example 10 of the invention.
Figure 20A:
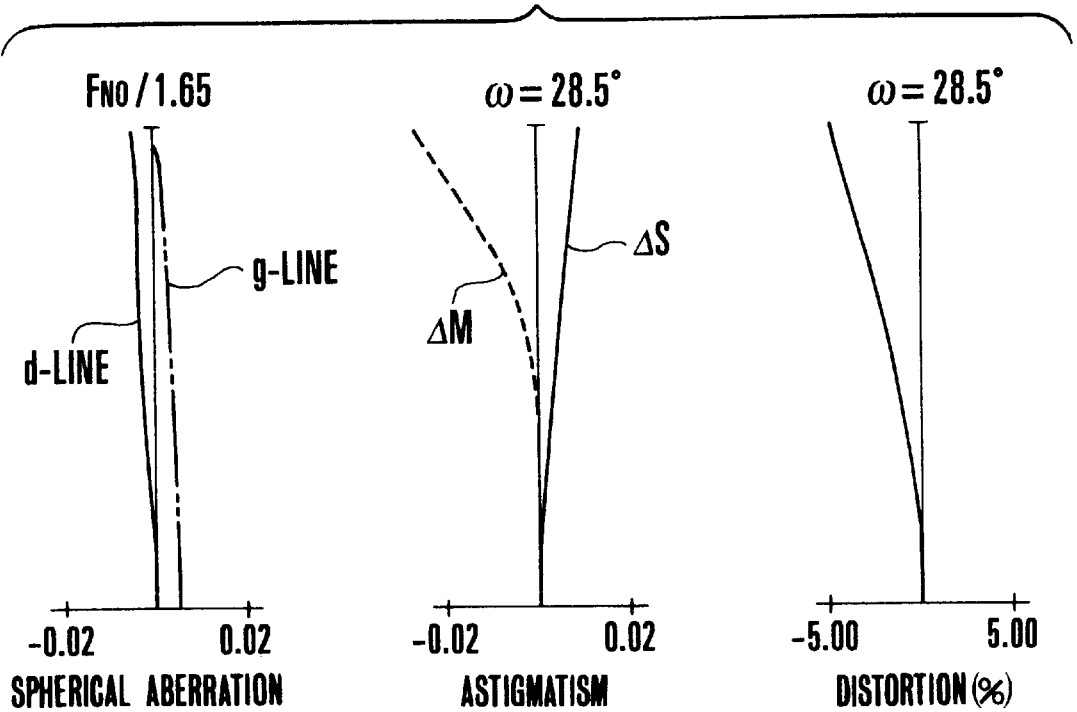
FIGS. 20(A) and 20(B) are graphic representations of the aberrations of the numerical example 10 of the invention.
Figure 20B:
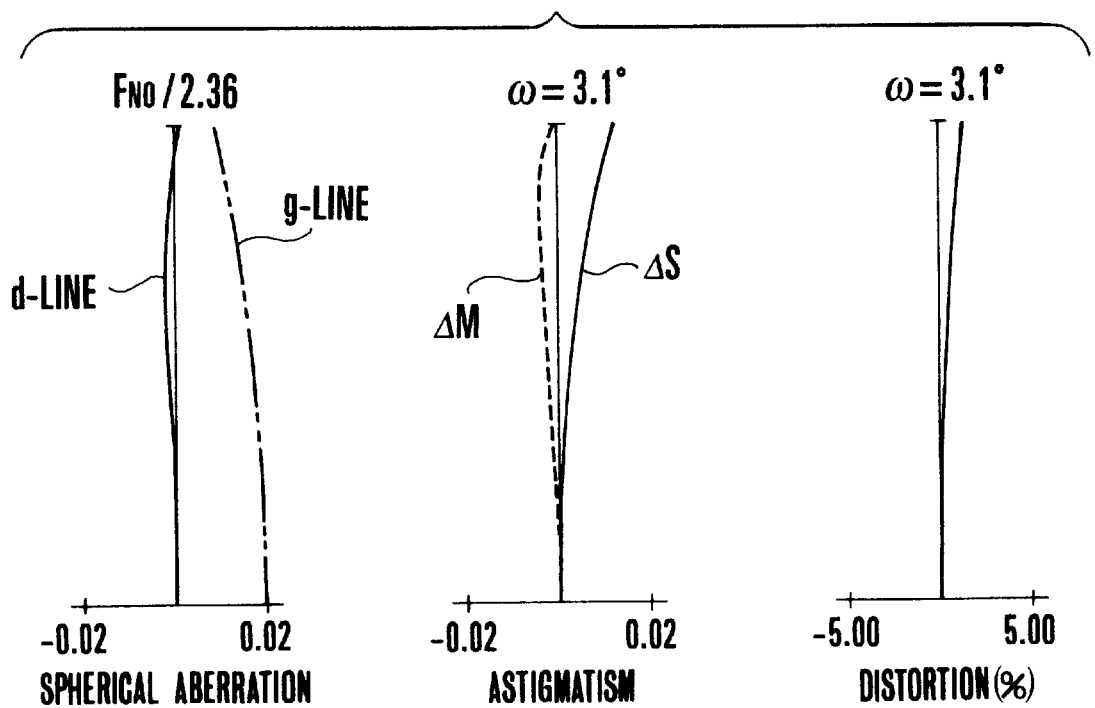

FIG. 13 is a lens block diagram of a numerical example 7 of the invention in the wide-angle end. The zoom lens comprises, from front to rear, a first lens unit 1 stationary during zooming, a second lens unit 2 of negative refractive power for varying the focal length, a third lens unit 3 of positive refractive power stationary during zooming and a fourth lens unit of positive refractive power both for compensating for the image shift with zooming and for focusing. An aperture stop SP is fixed and positioned between the second and third lens units. When zooming from the wide-angle end to the telephoto end, the second and fourth lens units move axially, while depicting loci shown by the arrows (on the assumption that the movements are expanded in the time axis). A color separation prism 10 known to those skilled in the art or an equivalent thereof may be removed. Each image sensor is disposed on an image plane 11.

In such a zoom lens, the back focal distance must be made long enough to allow insertion of, for example, a prism for color separation thereto. For this purpose, it is recommended that the refractive power of the third lens unit is made weak, while the refractive power of the fourth lens unit is made stronger than the moderate degree. If so, the diameter of the light beam incident on the fourth lens unit increases with increase of the refractive power thereof. At the same time, the possibility with which the fourth lens unit produces spherical aberration and coma is increased.

In the invention, the fourth lens unit is constructed with at least three positive lenses and at least one negative lens, thereby making it possible to reduce the spherical aberration and coma that the fourth lens unit produces as the back focal distance increases.

Desirably, for the purpose of correcting aberrations, the fourth lens unit is constructed, comprising, from front to rear, a first positive lens, a negative lens, a second positive lens and a third positive lens, thereby giving an advantage.

To simultaneously fulfill preservation of the adequate back focal distance and improvement of the optical performance to a level required for the lens adapted to, for example, the multiple chip type camera, it is preferred to determine the refractive powers of the third and fourth lens units so as to satisfy the following conditions:

$$2.5 < BFw/Fw < 6.0 \quad (7)$$

$$1.5 < F_3/F_4 < 3.2 \quad (8)$$

where Fi is the focal length of the i-th lens unit and Fw and BFw are respectively the shortest focal length and the back focal distance for the wide-angle end of the entire system (under the condition that there are no prism and low pass filters or the like.)

When the lower limit of the condition (7) is exceeded, the back focal distance becomes too short (to dispose the color separation prism and associated parts thereof) and the eye relief is so short that the departure from the telecentric system is appreciable. As the angle at which the light rays are incident on the prism is, therefore, tight, color shading is produced. Conversely when the back focal distance is too long as exceeding the upper limit, the fourth lens unit becomes larger in diameter and heavier, giving rise to problems such as that of hardly performing smooth focusing. As is understandable from the foregoing, the condition (7) has an aim to increase the back focal distance and the eye relief with the limitation of the physical length to a minimum. In this respect, a more desirable range is:

$$3.0 < BFw/Fw < 5.0$$

The condition (8) is concerned with the focal lengths of the third and fourth lens units and has an aim to simultaneously fulfill the requirements of achieving improvements of the compact form of the section from the stop to the rear vertex, of increasing the back focal distance and the eye relief to sufficiently long lengths, and of maintaining good stability of optical performance. When the lower limit of the condition (8) is exceeded, as this implies that the focal length of the third lens unit is too short, it becomes difficult to correct the variation of spherical aberration with zooming or focusing. It becomes also difficult in some cases to secure the sufficiently long back focal distance. In other cases, the eye relief in the middle focal length position becomes too short. Even a further problem arises in that, as the movement of the fourth lens unit is increased, the range of variation of aberrations with zooming or focusing increases largely. Conversely when the focal length of the third lens unit is too long as exceeding the upper limit, the light beam emerging from the third lens unit diverges greatly. Therefore, the effective diameter of the fourth lens unit has to increase. Because of its being heavy, a problem arises in that smooth focusing becomes impossible to perform.

Other features are that the third lens unit is constructed with at least one negative lens and at least one positive lens, and that the frontmost lens in the third lens unit is made to be a negative lens, thereby assuring elongation of the back focal distance and the eye relief to sufficiently long lengths.

Further, it is preferable that the frontmost lens in the third lens unit has its rear surface made concave toward the image side and strong in curvature. With this, it is made possible to cancel the spherical aberration that is produced when the light beam from the frontmost or negative lens enters the next lens, as this light beam is diverged for the purpose of elongating the back focal distance and the eye relief.

Meanwhile, to shorten the physical length of the complete lens and minimize the diameter of the front members, the refractive power of the second lens unit and the refractive indices of its negative constituent lenses are determined so as to satisfy the following conditions (9) and (10):

$$0.9 < |F_2/Fw| < 2 \qquad (9)$$

$$1.75 < \overline{N}_2 \qquad (10)$$

where $\overline{N}_2$ is the average refractive index of the negative lenses in the second lens unit.

The condition (9) is concerned with the focal length of the second lens unit. When the lower limit of the condition is exceeded, as this means that the focal length of the second lens unit is too short, large under-correction of Petzval sum results and it becomes difficult to correct the inclination of the image surface and other aberrations. Conversely when the focal length of the second lens unit is too long as exceeding the upper limit, the movement of the second lens unit increases, giving rise to a problem that the diameter of the first lens unit is too large.

When the refractive index of the negative lens of the second lens unit is smaller than the lower limit of the condition (10), large under-correction of Petzval sum results and it becomes difficult to correct curvature of field.

It should be noted that the above-described conditions (7) to (10) may be used in combination. Which of these to select depends on the specification. This is advantageous at improving the performance.

Next, numerical examples 7 to 10 of the invention are shown. In the numerical data for the examples 1 to 10, Ri is the radius of curvature of the i-th lens surface, when counted from the object side, Di is the axial i-th thickness or air separation, when counted from the object side, and Ni and vi are respectively the refractive index and Abbe number of the glass of the i-th lens element, when counted from the object side.

R27-R29 in the numerical examples 7 to 9 and R25 to R27 in the numerical example 10 indicate optical filters, face plates or the like, which, if not necessary, may be removed.

The shape of an aspheric surface is expressed in the ordinates with an X axis in the axial direction and an H axis in the direction perpendicular to the optical axis, the direction in which light advances being taken as positive, by the following equation:

$$X = (1/R)H^2 \Big/ \left(1 + \sqrt{1 - (1+k)(H/R)^2}\right) + BH^4 + CH^6 + DH^8 + EH^{10} + FH^{12}$$

The values of the factors in the before-described conditions (7) to (10) for the numerical examples 7 to 10 are listed in Table-2.

Numerical Example 7:
f = 1–10.00   Fno. = 1.65–2.13   2ω = 47.0°–6.2°

| | | | |
|---|---|---|---|
| R1 = 11.304 | D1 = 0.24 | N1 = 1.846660 | v1 = 23.8 |
| R2 = 5.169 | D2 = 0.95 | N2 = 1.603112 | v2 = 60.7 |
| R3 = −33.966 | D3 = 0.03 | | |
| R4 = 4.381 | D4 = 0.56 | N3 = 1.712995 | v3 = 53.8 |
| R5 = 11.713 | D5 = Variable | | |
| R6 = 6.932 | D6 = 0.10 | N4 = 1.882997 | v4 = 40.8 |
| R7 = 1.184 | D7 = 0.46 | | |
| R8 = −2.573 | D8 = 0.10 | N5 = 1.882997 | v5 = 40.8 |
| R9 = 5.649 | D9 = 0.13 | | |
| R10 = 3.439 | D10 = 0.42 | N6 = 1.846660 | v6 = 23.8 |
| R11 = −3.091 | D11 = 0.04 | | |
| R12 = −2.453 | D12 = 0.12 | N7 = 1.804000 | v7 = 46.6 |
| R13 = −4.999 | D13 = Variable | | |
| R14 = (Stop) | D14 = 0.34 | | |
| R15 = 6.451 | D15 = 0.14 | N8 = 1.603112 | v8 = 60.7 |
| R16 = 3.203 | D16 = 0.47 | | |
| R17 = 4.027 | D17 = 1.03 | N9 = 1.603420 | v9 = 38.0 |
| R18 = −2.134 | D18 = 0.15 | N10 = 1.834807 | v10 = 42.7 |
| R19 = −5.089 | R19 = Variable | | |
| R20 = −4.597 | D20 = 0.42 | N11 = 1.516330 | v11 = 64.2 |
| R21 = −3.121 | D21 = 0.03 | | |
| R22 = 7.105 | D22 = 0.15 | N12 = 1.846660 | v12 = 23.8 |
| R23 = 2.504 | D23 = 0.69 | Ni3 = 1.487490 | v13 = 70.2 |
| R24 = −12.109 | D24 = 0.03 | | |
| R25 = 3.316 | D25 = 0.56 | N14 = 1.496999 | v14 = 81.6 |
| R26 = −35.722 | D26 = 0.68 | | |
| R27 = ∞ | D27 = 0.51 | N1S = 1.516330 | vi5 = 64.2 |
| R28 = ∞ | D28 = 3.22 | N16 = 1.603420 | v16 = 38.0 |
| R29 = ∞ | | | |

| Variable | Focal Length | | |
|---|---|---|---|
| Separations | 1.00 | 4.69 | 10.00 |
| D5 | 0.15 | 3.31 | 4.20 |
| D13 | 4.31 | 1.15 | 0.26 |
| D19 | 2.05 | 1.40 | 2.05 |

Numerical Example 8:
f = 1–12.05   Fno. = 1.65–2.00   2ω = 65.2°–6.1°

| | | | |
|---|---|---|---|
| R1 = 30.571 | D1 = 0.36 | N1 = 1.805181 | v1 = 25.4 |
| R2 = 7.287 | D2 = 0.40 | | |
| R3 = 12.246 | D3 = 1.00 | N2 = 1.696797 | v2 = 55.5 |
| R4 = −32.680 | D4 = 0.04 | | |
| R5 = 5.945 | D5 = 1.10 | N3 = 1.696797 | v3 = 55.5 |
| R6 = −1305.780 | D6 = Variable | | |
| R7 = 8.578 | D7 = 0.16 | N4 = 1.882997 | v4 = 40.8 |
| R8 = 1.772 | D8 = 0.68 | | |
| R9 = −2.647 | D9 = 0.14 | N5 = 1.696797 | v5 = 55.5 |
| R10 = 3.033 | D10 = 0.20 | | |
| R11 = 3.638 | D11 = 0.46 | N6 = 1.846659 | v6 = 23.8 |
| R12 = −17.452 | D12 = Variable | | |
| R13 = (Stop) | D13 = 0.30 | | |
| R14 = −14.240 | D14 = 0.14 | N7 = 1.603112 | v7 = 60.7 |
| R15 = 4.595 | D15 = 0.26 | | |

-continued

| | | | |
|---|---|---|---|
| R16 = -9.032 | D16 = 0.40 | N8 = 1.603112 | ν8 = 38.0 |
| R17 = -4.333 | D17 = 0.60 | | |
| R18 = 4.101 | D18 = 1.14 | N9 = 1.603420 | ν9 = 38.0 |
| R19 = -2.568 | D19 = 0.18 | N10 = 1.785896 | ν10 = 44.2 |
| R20 = -9.589 | D20 = Variable | | |
| R21 = -11.910 | D21 = 0.50 | N11 = 1.516330 | ν11 = 64.2 |
| R22 = -4.499 | D22 = 0.03 | | |
| R23 = 11.430 | D23 = 0.18 | N12 = 1.805181 | ν12 = 25.4 |
| R24 = 2.474 | D24 = 1.04 | N13 = 1.487490 | ν13 = 70.2 |
| R25 = -22.902 | D25 = 0.03 | | |
| R26 = 4.228 | D26 = 0.68 | N14 = 1.487490 | ν14 = 70.2 |
| R27 = -10.421 | D27 = 0.80 | | |
| R28 = ∞ | D28 = 0.50 | N15 = 1.516330 | ν15 = 64.2 |
| R29 = ∞ | D29 = 4.00 | N16 = 1.603420 | ν16 = 38.0 |
| R30 = ∞ | | | |

| Variable Separations | Focal Length | | |
|---|---|---|---|
| | 1.00 | 5.18 | 12.05 |
| D6 | 0.29 | 4.50 | 5.68 |
| D12 | 5.70 | 1.49 | 0.30 |
| D20 | 1.82 | 1.07 | 1.83 |

Numerical Example 9:
f = 1–10.00   Fno. = 1.65–2.33   2ω = 56.1°–6.1°

| | | | |
|---|---|---|---|
| R1 = 12.685 | D1 = 0.20 | N1 = 1.846660 | ν1 = 23.8 |
| R2 = 5.675 | D2 = 0.83 | N2 = 1.603112 | ν2 = 60.7 |
| R3 = -33.085 | D3 = 0.03 | | |
| R4 = 4.668 | D4 = 0.47 | N3 = 1.712995 | ν3 = 53.8 |
| R5 = 11.792 | D5 = Variable | | |
| R6 = 6.964 | D6 = 0.10 | N4 = 1.882997 | ν4 = 40.8 |
| R7 = 1.263 | D7 = 0.47 | | |
| R8 = -3.174 | D8 = 0.10 | N5 = 1.882997 | ν5 = 40.8 |
| R9 = 8.392 | D9 = 0.12 | | |
| R10 = 3.188 | D10 = 0.42 | N6 = 1.846660 | ν6 = 23.8 |
| R11 = -3.671 | D11 = 0.05 | | |
| R12 = -2.708 | D12 = 0.10 | N7 = 1.772499 | ν7 = 49.6 |
| R13 = -9.576 | D13 = Variable | | |
| R14 = (Stop) | D14 = 0.33 | | |
| R15 = 8.699 | D15 = 0.13 | N8 = 1.603112 | ν8 = 60.7 |
| R16 = 3.003 | D16 = 0.50 | | |
| R17 = 3.874 | D17 = 0.97 | N9 = 1.603420 | ν9 = 38.0 |
| R18 = -2.061 | D18 = 0.15 | N10 = 1.834807 | ν10 = 42.7 |
| R19 = -5.583 | D19 = Variable | | |
| R20 = -4.652 | D20 = 0.33 | N11 = 1.516330 | ν11 = 64.2 |
| R21 = -2.964 | D21 = 0.03 | | |
| R22 = 7.735 | D22 = 0.15 | N12 = 1.846660 | ν12 = 23.8 |
| R23 = 2.649 | D23 = 0.75 | N13 = 1.487490 | ν13 = 70.2 |
| R24 = -10.873 | D24 = 0.02 | | |
| R25 = 3.494 | D25 = 0.50 | N14 = 1.516330 | ν14 = 64.2 |
| R26 = -29.431 | D26 = 0.67 | | |
| R27 = ∞ | D27 = 0.42 | N15 = 1.516330 | ν15 = 64.2 |
| R28 = ∞ | D28 = 4.00 | N16 = 1.603420 | ν16 = 38.0 |
| R29 = ∞ | | | |

| Variable Separations | Focal Length | | |
|---|---|---|---|
| | 1.00 | 4.88 | 10.00 |
| D5 | 0.21 | 3.72 | 4.71 |
| D13 | 4.67 | 1.16 | 0.17 |
| D19 | 1.98 | 1.33 | 1.98 |

Numerical Example 10:
f = 1–10.00   Fno. = 1.65–2.36   2ω = 57.0°–6.2°

| | | | |
|---|---|---|---|
| R1 = 8.852 | D1 = 0.22 | N1 = 1.846660 | ν1 = 23.8 |
| R2 = 4.373 | D2 = 0.92 | N2 = 1.603112 | ν2 = 60.7 |
| R3 = -54.672 | D3 = 0.03 | | |
| R4 = 4.110 | D4 = 0.61 | N3 = 1.712995 | ν3 = 53.8 |
| R5 = 13.484 | D5 = Variable | | |
| R6 = 20.450 | D6 = 0.10 | N4 = 1.882997 | ν4 = 40.8 |
| R7 = 1.101 | D7 = 0.36 | | |
| R8 = -2.544 | D8 = 0.10 | N5 = 1.882997 | ν5 = 40.8 |
| R9 = 9.055 | D9 = 0.13 | | |
| R10 = 2.850 | D10 = 0.37 | N6 = 1.846660 | ν6 = 23.8 |
| R11 = -3.522 | D11 = 0.12 | N7 = 1.583126 | ν7 = 59.4 |
| R12 = 13.559 | D12 = Variable | | |
| (Aspheric) | | | |
| R13 = (Stop) | D13 = 0.25 | | |
| R14 = -4.153 | D14 = 0.14 | N8 = 1.583126 | ν8 = 59.4 |
| R15 = 2.570 | D15 = 0.72 | | |
| (Aspheric) | | | |
| R16 = 4.260 | D16 = 0.59 | N9 = 1.581439 | ν9 = 40.8 |
| R17 = -9.497 | D17 = Variable | | |
| R18 = -2.235 | D18 = 0.37 | N10 = 1.516330 | ν10 = 64.2 |
| R19 = -3.295 | D19 = 0.03 | | |
| R20 = 10.633 | D20 = 0.15 | N11 = 1.805181 | ν11 = 25.4 |
| R21 = 2.709 | D21 = 0.64 | N12 = 1.496999 | ν12 = 81.6 |
| R22 = -8.755 | D22 = 0.03 | | |
| R23 = 3.856 | D23 = 0.46 | N13 = 1.622992 | ν13 = 58.1 |
| R24 = ∞ | D24 = 1.15 | | |
| R25 = ∞ | D25 = 0.51 | N14 = 1.516330 | ν14 = 64.2 |
| R26 = ∞ | D26 = 3.22 | N15 = 1.603420 | ν15 = 38.0 |
| R27 = ∞ | | | |

| Variable Separations | Focal Length | | |
|---|---|---|---|
| | 1.00 | 4.68 | 10.00 |
| D5 | 0.16 | 2.81 | 3.56 |
| D12 | 3.66 | 1.00 | 0.25 |
| D17 | 2.54 | 1.83 | 2.57 |

R12: K = 1.26683 × $10^2$   B = -4.11855 × $10^{-3}$   C = -2.32284 × $10^{-3}$
R15: K = 6.40035 × $10^{-2}$   B = 2.47645 × $10^{-3}$   C = -4.51939 × $10^{-4}$

TABLE 2

| Condition Factor | Focal Length | | | |
|---|---|---|---|---|
| | 7 | 8 | 9 | 10 |
| BFw/Fw | 3.732 | 4.455 | 4.106 | 3.954 |
| $F_3/F_4$ | 1.989 | 2.065 | 2.492 | 1.967 |
| $F_2/Fw$ | 1.425 | 1.701 | 1.582 | 1.203 |
| $\bar{N}_2$ | 1.857 | 1.790 | 1.846 | 1.783 |

According to the invention, the rules of design for the lens units are set forth as described above, and the focusing configuration in which the fourth lens unit is moved is employed, to thereby achieve minimization of the bulk and size of the entire system in such a manner that aberrations are well corrected throughout the entire zooming range and the range of variation of aberrations with focusing is minimized. Hence, it has been made possible to achieve a zoom lens of the rear focus type whose back focal distance and eye relief are sufficiently long and which has a large relative aperture.

What is claimed is:

1. A zoom lens comprising, from front to rear, a first lens unit having a positive refractive power, a second lens unit having a negative refractive power, a third lens unit, and a fourth lens unit having a positive refractive power, zooming being performed by moving said second lens unit and said fourth lens unit and focusing being performed by moving said fourth lens unit, wherein said third lens unit has at least one negative lens and at least one positive lens, wherein the frontmost lens in said third lens unit is a negative lens, and wherein a stop is arranged just in front of said third lens unit, said zoom lens satisfying the following condition:

3.0<BFw/Fw<4.5 where Fw is the overall focal length for a wide-angle end of the entire lens system and BFw is the back focal distance for the wide-angle end and infinite object distance of said zoom lens, wherein said second lens unit has a negative lens at a position closest to the image side thereof, and wherein said second lens unit comprises, from front to rear, a first negative lens, a second negative lens, a first positive lens, and a third negative lens.

2. A zoom lens according to claim 1, wherein the negative lens at the frontmost position in said third lens unit has a surface of concave curvature toward an image side having a stronger refracting power than that of the opposite surface.

3. A zoom lens according to claim 2, wherein said fourth lens unit includes at least one negative lens and two positive lenses.

4. A zoom lens according to claim 3, wherein said fourth lens unit includes, from front to rear, a negative first lens having a surface of concave curvature toward the image side and having a stronger refracting power than that of the opposite surface, a positive second lens whose both surfaces are convex and a positive third lens.

5. A zoom lens according to claim 1, satisfying the following conditions:

$$1.5 < F_3/F_4 < 20$$

$$-0.5 < Ft/Fat < 0.5$$

$$-2 < Fw/F_2 < -0.25$$

where $F_2$, $F_3$ and $F_4$ are the focal lengths of said second, third and fourth lens units, respectively, Ft is the overall focal length for a telephoto end of the entire lens system, and Fat is the overall focal length for the telephoto end of said first to third lens units.

6. A zoom lens according to claim 1, wherein said third lens unit is fixed during zooming.

7. A zoom lens comprising, from front to rear, a first lens unit of positive refractive power, a second lens unit of negative refractive power, a third lens unit of positive refractive power and a fourth lens unit of positive refractive power, an aperture stop being positioned between said second lens unit and said third lens unit, said second lens unit and said fourth lens unit being moved to vary the focal length, and said fourth lens unit being the only lens unit moved to effect focusing, wherein said fourth lens unit includes at least three positive lenses and one negative lens, wherein said second lens unit has a negative lens at a position closest to the image side thereof, wherein said second lens unit comprises, from front to rear, a first negative lens, a second negative lens, a first positive lens, and a third negative lens, and wherein said first lens unit and said third lens unit are fixed during zooming.

8. A zoom lens according to claim 7, satisfying the following conditions:

$$2.5 < BFW/Fw < 6.0$$

$$1.5 < F_3/F_4 < 3.2$$

where $F_3$ and $F_4$ are the focal lengths of said third lens unit and said fourth lens unit, respectively, Fw is the shortest focal length of the entire lens system and BFw is the back focal distance for a wide-angle end.

9. A zoom lens according to claim 7 or 8, wherein said fourth lens unit includes, from front to rear, a first positive lens, a negative lens, a second positive lens and a third positive lens.

10. A zoom lens according to claim 7 or 8, wherein said third lens unit has a negative lens at the frontmost position thereof.

11. A zoom lens according to claim 7 or 8, satisfying the following conditions:

$$0.9 < |F_2/Fw| < 2$$

$$1.75 < \overline{N}_2$$

where $\overline{N}_2$ is the average refractive index of negative lenses in said second lens unit, $F_2$ is the focal length of said second lens unit, and Fw is the shortest focal length of the entire lens system.

12. An image pickup system comprising, from front to rear, a first lens unit of positive refractive power, a second lens unit of negative refractive power, a third lens unit of positive refractive power and a fourth lens unit of positive refractive power, an aperture stop being positioned between said second lens unit and said third lens unit, said second lens unit and said fourth lens unit being axially moved to vary the focal length, and said fourth lens unit being the only lens unit axially moved to effect focusing, wherein said fourth lens unit includes at least three positive lenses and one negative lens, wherein a color separation optical element is arranged on an image side of said fourth lens unit, wherein said second lens unit has a negative lens at a position closest to the image side thereof, wherein said second lens unit comprises, from front to rear, a first negative lens, a second negative lens, a first positive lens, and a third negative lens, and wherein said first lens unit and said third lens unit are fixed during zooming.

* * * * *